US009853856B2

(12) United States Patent
Hu et al.

(10) Patent No.: US 9,853,856 B2
(45) Date of Patent: Dec. 26, 2017

(54) METHOD AND DEVICE FOR PROTECTING SERVICE RELIABILITY AND NETWORK VIRTUALIZATION SYSTEM

(71) Applicant: Huawei Technologies Co., Ltd., Shenzhen, Guangdong (CN)

(72) Inventors: Jiehui Hu, Shenzhen (CN); Jie Yang, Shenzhen (CN); Xiaoqian Wu, Shenzhen (CN); Xinping Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 153 days.

(21) Appl. No.: 14/879,845

(22) Filed: Oct. 9, 2015

(65) Prior Publication Data

US 2016/0036625 A1 Feb. 4, 2016

Related U.S. Application Data

(63) Continuation of application No. PCT/CN2013/073973, filed on Apr. 9, 2013.

(51) Int. Cl.
*H04L 12/24* (2006.01)
*H04L 12/26* (2006.01)
(Continued)

(52) U.S. Cl.
CPC ...... *H04L 41/0668* (2013.01); *H04L 12/4633* (2013.01); *H04L 41/0663* (2013.01);
(Continued)

(58) Field of Classification Search
CPC ............. H04L 41/0668; H04L 41/0663; H04L 12/4633; H04L 43/08; H04L 43/0811;
(Continued)

(56) References Cited

U.S. PATENT DOCUMENTS 7,266,124 B2 * 9/2007 Kim .................... H04L 12/4641 370/395.3
7,269,132 B1 * 9/2007 Casey ................. H04L 41/0663 370/219

(Continued)

FOREIGN PATENT DOCUMENTS

CN 1863069 A 11/2006
CN 102098231 A 6/2011

(Continued)

OTHER PUBLICATIONS

Fonseca et al., "A Replication Component for Resilient OpenFlow-based Networking," IEEE Network Operations and Management Symposium (NOMS): Mini-Conference, Maui, Hawaii, pp. 933-939, Institute of Electrical and Electronics Engineers, New York, New York (Apr. 16-20, 2012).

(Continued)

*Primary Examiner* — Edan Orgad
*Assistant Examiner* — Ivan O Latorre
(74) *Attorney, Agent, or Firm* — Leydig, Voit & Mayer, Ltd.

(57) ABSTRACT

Disclosed is a method and a device for protecting service reliability, and the service reliability in the network virtualization system provided by the present disclosure may be ensured. In an embodiment of the present disclosure, a master node having a control function obtains the current service type information and notifies a slave node of the current service type information, for enabling the slave node to determine a main virtual link and a backup virtual link according to the service type information and to perform the failure detection, and when detecting that the main virtual link has failure and the backup virtual link has no failure, a service data message is switched to be transmitted on the backup virtual link, to ensure non-interrupted transmission of a service data message in a brand-new system architecture (Continued)

provided by the present disclosure, so as to ensure the service reliability.

24 Claims, 12 Drawing Sheets

(51) Int. Cl.
*H04L 12/46* (2006.01)
*H04L 12/707* (2013.01)
*H04L 12/703* (2013.01)

(52) U.S. Cl.
CPC .......... *H04L 43/0811* (2013.01); *H04L 45/22* (2013.01); *H04L 45/28* (2013.01)

(58) Field of Classification Search
CPC ... H04L 45/28; H04L 45/22; H04L 12/40202; H04L 29/08351; H04L 67/1051; H04W 52/0212; H04W 84/20; H04W 84/22; H04W 4/008
See application file for complete search history.

(56) References Cited

U.S. PATENT DOCUMENTS 8,213,439 B2 * 7/2012 Natarajan, Sr. ......... H04L 45/00 370/217
2006/0047851 A1 * 3/2006 Voit ........................ H04L 45/48 709/239
2007/0008982 A1 * 1/2007 Voit ...................... H04L 12/462 370/401
2009/0154339 A1 6/2009 Zi
2009/0290591 A1 * 11/2009 Zhang ..................... H04L 45/00 370/401
2010/0158010 A1 * 6/2010 Kang ...................... H04L 45/00 370/392
2010/0284308 A1 * 11/2010 Lv ....................... H04L 12/4641 370/254
2012/0236730 A1 * 9/2012 Zhou ..................... H04L 45/245 370/244
2012/0236868 A1 9/2012 Yan
2013/0250966 A1 * 9/2013 Gu .......................... H04L 45/04 370/401
2013/0286893 A1 * 10/2013 Zhu ......................... H04L 45/64 370/254
2014/0211641 A1 * 7/2014 Gohite ................ H04L 12/4641 370/252
2014/0281669 A1 * 9/2014 Decusatis ........... G06F 11/2005 714/4.11
2015/0180766 A1 * 6/2015 Racz ..................... H04L 47/122 370/218
2017/0005921 A1 * 1/2017 Liu ......................... H04L 45/64

FOREIGN PATENT DOCUMENTS

CN 102377607 A 3/2012
CN 102651711 A 8/2012
EP 2506505 A1 10/2012
WO WO 2011/066810 * 6/2011 ............. H04L 12/56

OTHER PUBLICATIONS

"OpenFlow Switch Specification," OpenFlow, Version 1.2 (Wire Protocol 0x03), pp. 1-82, The Open Networking Foundation, Palo Alto, California (Dec. 5, 2011).
"Split Architecture for Large Scale Wide Area Networks," SPARC ICT-258457, Deliverable D3.3, pp. 1-129, SPARC consortium (2012).
Sharafat et al., "MPLS-TE and MPLS VPNs with OpenFlow," SIGCOMM'11, Toronto, Canada, Association for Computing Machinery, New York, New York (Aug. 15-19, 2011).

* cited by examiner

METHOD AND DEVICE FOR PROTECTING SERVICE RELIABILITY AND NETWORK VIRTUALIZATION SYSTEM

CROSS-REFERENCE TO RELATED APPLICATIONS

This application is a continuation of International Patent Application No. PCT/CN2013/073973, filed on Apr. 9, 2013, which is hereby incorporated by reference in its entirety.

TECHNICAL FIELD

The present disclosure relates to the field of communication technologies, and in particular, to a method and a device for protecting service reliability and a network virtualization system.

BACKGROUND

Base station backhaul refers to a transmission network concentrated between a base station (BTS) and a base station controller (BSC), which is called RAN (Radio Access Network). IPRAN is an integrated solution of a router/switch customized for optimizing a base station backhaul application scenario, which has the ability of circuit simulation, synchronization and the like. An IPRAN bearing solution is to adopt IP/MPLS technology at a convergence layer (the convergence layer may also be called a core layer) in a metropolitan area, and an access layer mainly adopts enhanced Ethernet technology or a solution of combining with the IP/MPLS technology. The device adopted by a core convergence node is a router supporting IP/MPLS, and the device adopted by a base station access node is a router or a three-layer switch.

At present, the management of the IPRAN solution configuration is complex, so more initial configurations are needed, and the service IP and IGP domain of CSG are planned before issuing a service; in daily maintenance, the configuration adjustment of the device still needs manual intervention, and automation is unavailable. With the continuous growth of the network scale, the service volume and the number of users, this problem will become more prominent. By adopting network virtualization in the IPRAN, the configuration and management may be simplified, the service may be opened quickly, and meanwhile, a corresponding service reliability protection solution needs to be provided for the IPRAN.

SUMMARY

Embodiments of the present disclosure provide a method and a device for protecting service reliability and a network virtualization system, achieving protection of service reliability.

To fulfill the above-mentioned objectives, the embodiments of the present disclosure adopt the following technical solutions:

In a first aspect, the embodiments of the present disclosure provide a method for protecting service reliability, wherein the method is applied to a network virtualization system based on control and forwarding separation, the network virtualization system includes master nodes and a slave node, the slave node is controlled by a pair of mutually main-backup master nodes, the pair of mutually main-backup master nodes includes a main master node and a backup master node, a first virtual link is arranged between the slave node and the main master node controlling the slave node, a second virtual link is arranged between the slave node and the backup master node controlling the slave node, and the method comprises:

receiving, by the slave node, service type information sent by the master node controlling the slave node through a control channel between the master node controlling the slave node and the slave node, wherein the service type information comprises L2VPN and L3VPN;

determining, by the slave node, a main virtual link and a backup virtual link according to the service type information; wherein the main virtual link is a virtual link of the first virtual link and the second virtual link, the main virtual link is a virtual link used for transmitting a service data message, the backup virtual link is the other virtual link rather than the main virtual link of the first virtual link and the second virtual link;

detecting, by the slave node, whether the main virtual link and the backup virtual link have failure;

when detecting that the main virtual link has failure and the backup virtual link has no failure, switching, by the slave node, to transmit the service data message on the backup virtual link.

In combination with the first aspect, in a first possible implementation manner, the determining a main virtual link and a backup virtual link according to the service type information, comprises:

when the service type is L2VPN, setting, by the slave node, the first virtual link as the main virtual link, and setting the second virtual link as the backup virtual link;

or, when the service type is L2VPN, determining, by the slave node, the main virtual link and the backup virtual link according to the state information respectively sent by the main master node controlling the slave node and the backup master node controlling the slave node;

or, when the service type is L3VPN, setting, by the slave node, the first virtual link as the main virtual link, and setting the second virtual link as the backup virtual link;

or, when the service type is L3VPN, determining, by the slave node, the main virtual link and the backup virtual link according to interface routing state information respectively sent by the main master node controlling the slave node and the backup master node controlling the slave node, wherein the interface routing state information refers to routing state information of a virtual remote logical interface having a corresponding relationship with an external interface of the slave node and located on the main master node or the backup master node, and the external interface refers to an interface of the slave node, which is connected with a network device outside the network virtualization system based on control and forwarding separation.

In combination with the first possible implementation manner of the first aspect, in a second possible implementation manner, the determining, by the slave node, the main virtual link and the backup virtual link according to the state information sent by the main master node controlling the slave node and the backup master node controlling the slave node, comprises:

receiving, by the slave node, the state information sent by the main master node through the control channel between the main master node and the slave node;

receiving, by the slave node, the state information sent by the backup master node through the control channel between the backup master node and the slave node;

when the received state information sent by the main master node is an Active active state, setting, by the slave node, the first virtual link as the main virtual link, and transmitting the service data message on the first virtual link, and when the received state information sent by the backup master node is a Standby standby state, setting, by the slave node, the second virtual link as the backup virtual link;

or when the received state information sent by the main master node is Standby, setting, by the slave node, the first virtual link as the backup virtual link, and when the received state information sent by the backup master node is Active, setting, by the slave node, the second virtual link as the main virtual link, and transmitting the service data message on the second virtual link.

In combination with the first possible implementation manner of the first aspect, in a third possible implementation manner, the determining, by the slave node, the main virtual link and the backup virtual link according to interface routing state information respectively sent by the main master node controlling the slave node and the backup master node controlling the slave node, comprises:

receiving, by the slave node, the interface routing state information sent by the main master node through the control channel between the main master node and the slave node;

receiving, by the slave node, the interface routing state information sent by the backup master node through the control channel between the backup master node and the slave node;

when the received interface routing state information sent by the main master node is an Active active state, setting, by the slave node, the first virtual link as the main virtual link, and transmitting the service data message on the first virtual link; when the received interface routing state information sent by the backup master node is a Standby standby state, setting, by the slave node, the second virtual link as the backup virtual link;

or, when the received interface routing state information sent by the main master node is the Standby standby state, setting, by the slave node, the first virtual link as the backup virtual link, and when the received interface routing state information sent by the backup master node is the Active active state, setting, by the slave node, the second virtual link as the main virtual link, and transmitting the service data message on the second virtual link.

In combination with the first aspect or the foregoing three possible implementation manners of the first aspect, in a fourth possible implementation manner, the method further comprises:

when detecting that the main virtual link returns normal from the failure, switching, by the slave node, to transmit the service data message from the backup virtual link to the main virtual link.

In combination with the fourth possible implementation manner of the first aspect, in a fifth possible implementation manner, the switching, by the slave node, to transmit the service data message from the backup virtual link to the main virtual link, includes: within a preset time, simultaneously receiving, by the slave node, downlink service data messages transmitted on the main virtual link and the backup virtual link, and transmitting an uplink service data message on the backup virtual link, after the preset time, switching, by the slave node, to transmit both of the uplink service data message and the downlink service data message on the main virtual link.

In combination with the first aspect or the foregoing five possible implementation manners of the first aspect, in a sixth possible implementation manner, the detecting, by the slave node, whether the main virtual link and the backup virtual link have failure, comprises:

when the service type information is L2VPN, starting, by the slave node, to perform failure detection on an end-to-end virtual link, wherein the end-to-end virtual link refers to a virtual link forming by splicing a virtual link between the slave node and the master node controlling the slave node and in the network virtualization system, with a virtual link between the master node controlling the slave node and a remote signaling gateway RSG and outside the network virtualization system; correspondingly, the when detecting that the main virtual link has failure and the backup virtual link has no failure, switching, by the slave node, to transmit the service data message on the backup virtual link, comprises: when detecting that the end-to-end virtual link where the main virtual link is located has failure and the end-to-end virtual link where the backup virtual link is located has no failure, switching, by the slave node, to transmit the service data message on the backup virtual link;

or, when the service type information is L3VPN, starting, by the slave node, to perform failure detection on the virtual link in the network virtualization system, wherein the virtual link in the network virtualization system refers to a virtual link from the slave node to the master node and in the network virtualization system; correspondingly, the when detecting that the main virtual link has failure and the backup virtual link has no failure, switching, by the slave node, to transmit the service data message on the backup virtual link, comprises: when detecting that the virtual link in the network virtualization system where the main virtual link is located has failure and the virtual link in the network virtualization system where the backup virtual link is located has no failure, switching, by the slave node, to transmit the service data message on the backup virtual link.

In combination with the first aspect or the foregoing five possible implementation manners of the first aspect, in a seventh possible implementation manner, the detecting, by the slave node, whether the main virtual link and the backup virtual link have failure, comprises:

when the service type information is L2VPN, receiving, by the slave node, an enabling failure detection configuration command sent by the master node controlling the slave node through the control channel formed with the master node controlling the slave node, wherein the enabling failure detection configuration command is used for controlling the slave node to start to perform failure detection on an end-to-end virtual link, and the end-to-end virtual link refers to a virtual link forming by splicing a virtual link between the slave node and the master node controlling the slave node and in the network virtualization system, with a virtual link between the master node controlling the slave node and an RSG and outside the network virtualization system;

starting, by the slave node, to perform failure detection on the end-to-end virtual link according to the enabling failure detection configuration command; correspondingly, the when detecting that the main virtual link has failure and the backup virtual link has no failure, switching, by the slave node, to transmit the service data message on the backup virtual link, comprises: when detecting that the end-to-end virtual link where the main virtual link is located has failure and the end-to-end virtual link where the backup virtual link is located has no failure, switching, by the slave node, to transmit the service data message on the backup virtual link.

In a second aspect, the embodiments of the present disclosure provide a method for protecting service reliability, wherein the method is applied to a network virtualization system based on control and forwarding separation, the network virtualization system includes master nodes and a slave node, the slave node is controlled by a pair of mutually main-backup master nodes, the pair of mutually main-backup master nodes includes a main master node and a backup master node, a first virtual link is arranged between the slave node and the main master node controlling the slave node, a second virtual link is arranged between the slave node and the backup master node controlling the slave node, and the method comprises:

obtaining, by the master node, service type information, wherein the service type information comprises L2VPN and L3VPN;

sending the service type information to the slave node controlled by the master node through a control channel between the master node and the slave node controlled by the master node, for enabling the slave node controlled by the master node to determine a main virtual link and a backup virtual link according to the received service type information, and perform failure detection on the determined main virtual link and the backup virtual link.

In combination with the second aspect, in a first possible implementation manner, the obtaining, by the master node, service type information, comprises:

establishing a corresponding virtual remote logical interface for an external interface of the slave node controlled by the master node, wherein the external interface refers to an interface of the slave node controlled by the master node, which is connected with a network device outside the network virtualization system based on control and forwarding separation; and configuring a service outside the network virtualization system based on control and forwarding separation on the virtual remote logical interface, and obtaining the service type information corresponding to the configured service.

In combination with the first possible implementation manner of the second aspect, in a second possible implementation manner, after the sending the service type information to the slave node, the method further comprises:

sending an enabling failure detection configuration command to the slave node controlled by the master node, for enabling the slave node controlled by the master node to start to perform failure detection on an end-to-end virtual link according to the enabling failure detection configuration command; wherein the enabling failure detection configuration command is used for controlling the slave node controlled by the master node to start to perform the failure detection on the end-to-end virtual link, and the end-to-end virtual link refers to a virtual link forming by splicing a virtual link between the slave node and the master node and in the network virtualization system, with a virtual link between the master node and an RSG and outside the network virtualization system.

In combination with the second aspect or the foregoing two possible implementation manners of the present disclosure, in a third possible implementation manner, after the sending the service type information to the slave node controlled by the master node, the method further comprises:

receiving, by the master node, state information sent by an RSG, wherein the state information comprises Active and Standby; and sending, by the master node, the state information to the slave node controlled by the master node through the control channel formed with the slave node controlled by the master node.

In combination with the second aspect or the foregoing two possible implementation manners of the present disclosure, in a fourth possible implementation manner, after the sending the service type information to the slave node, the method further comprises:

when the master node detects that the interface routing corresponding to the slave node controlled by the master node has failure, reducing a routing priority level of the virtual remote logical interface located on the master node of the slave node controlled by the master node, and obtaining a routing priority level of the virtual remote logical interface on another master node corresponding to the slave node controlled by the master node, wherein the other master node and the master node are of a mutual main-backup relationship;

when determining that the routing priority level of the virtual remote logical interface located on the master node of the slave node controlled by the master node is lower than the routing priority level of the virtual remote logical interface on another master node corresponding to the slave node controlled by the master node, carrying a Standby state in interface routing state information, and sending the Standby state to the slave node controlled by the master node through the control channel formed with the slave node controlled by the master node.

In a third aspect, the present disclosure provides a slave node, wherein the slave node is applied to a network virtualization system based on control and forwarding separation, the network virtualization system includes master nodes and a slave node, the slave node is controlled by a pair of mutually main-backup master nodes, the pair of mutually main-backup master nodes includes a main master node and a backup master node, a first virtual link is arranged between the slave node and the main master node controlling the slave node, a second virtual link is arranged between the slave node and the backup master node controlling the slave node, and the slave node comprises:

a receiving unit, configured to receive service type information sent by the master node controlling the slave node through a control channel between the master node controlling the slave node and the slave node, wherein the service type information comprises L2VPN and L3VPN;

a determining unit, configured to determine a main virtual link and a backup virtual link according to the service type information received by the receiving unit; wherein the main virtual link is a virtual link of the first virtual link and the second virtual link, the main virtual link is a virtual link used for transmitting a service data message, and the backup virtual link is the other virtual link rather than the main virtual link of the first virtual link and the second virtual link;

a detecting unit, configured to detect whether the main virtual link and the backup virtual link determined by the determining unit have failure; and a switching unit, configured to, when the detecting unit detects that the main virtual link has failure and the backup virtual link has no failure, switch to transmit the service data message on the backup virtual link.

In combination with the third aspect, in a first possible implementation manner, the determining unit is configured to, when the service type is L2VPN, set the first virtual link as the main virtual link and set the second virtual link as the backup virtual link; further configured to, when the service type is L2VPN, determine the main virtual link and the backup virtual link according to the state information respectively sent by the main master node controlling the slave node and the backup master node controlling the slave node; further configured to, when the service type is L3VPN, set the first virtual link as the main virtual link and set the second virtual link as the backup virtual link; and further configured to, when the service type is L3VPN, determine the main virtual link and the backup virtual link according to interface routing state information respectively sent by the main master node controlling the slave node and the backup master node controlling the slave node, wherein the interface routing state information refers to the routing state information of a virtual remote logical interface having a corresponding relationship with an external interface of the slave node and located on the main master node or the backup master node, and the external interface refers to an interface of the slave node, which is connected with a network device outside the network virtualization system based on control and forwarding separation.

In combination with the first possible implementation manner of the third aspect, in a second possible implementation manner, the determining unit comprises:

a first receiving module, configured to enable the slave node to receive the state information sent by the main master node through the control channel between the main master node and the slave node;

the first receiving module, further configured to enable the slave node to receive the state information sent by the backup master node through the control channel between the backup master node and the slave node; and a determining module, configured to, when the state information sent by the main master node and received by the first receiving module is an Active active state, enable the slave node to set the first virtual link as the main virtual link, and transmit the service data message on the first virtual link, when the state information sent by the backup master node and received by the first receiving module is a Standby Standby state, set the second virtual link as the backup virtual link; and further configured to, when the state information sent by the main master node and received by the first receiving module is Standby, set the first virtual link as the backup virtual link, when the state information sent by the backup master node and received by the first receiving module is Active, set the second virtual link as the main virtual link, and transmit the service data message on the second virtual link.

In combination with the first possible implementation manner of the third aspect, in a third possible implementation manner, the determining unit includes:

a second receiving module, configured to enable the slave node to receive the interface routing state information sent by the main master node through the control channel between the main master node and the slave node;

the second receiving module, further configured to enable the slave node to receive the interface routing state information sent by the backup master node through the control channel between the backup master node and the slave node; and a setting module, configured to, when the interface routing state information sent by the main master node and received by the second receiving module is the Active active state, enable the slave node to set the first virtual link as the main virtual link, and transmit the service data message on the first virtual link, when the interface routing state information sent by the backup master node and received by the second receiving module is the Standby standby state, set the second virtual link as the backup virtual link; and further configured to, when the interface routing state information sent by the main master node is the Standby standby state, set the first virtual link as the backup virtual link, when the received interface routing state information sent by the backup master node and received by the second receiving module is the Active active state, set the second virtual link as the main virtual link, and transmit the service data message on the second virtual link.

In combination with the third aspect or the foregoing three possible implementation manners of the third aspect, in a fourth possible implementation manner, the switching unit is further configured to, when the detecting unit detects that the main virtual link returns normal from the failure, switch to transmit the service data message from the backup virtual link to the main virtual link.

In combination with the fourth possible implementation manner of the third aspect, in a fifth possible implementation manner, the switching unit is further configured to, within a preset time, enable the slave node to simultaneously receive downlink service data messages transmitted on the main virtual link and the backup virtual link, and transmit an uplink service data message on the backup virtual link, after the preset time, enable the slave node to transmit both of the uplink service data message and the downlink service data message on the main virtual link.

In combination with the third aspect or the foregoing five possible implementation manners of the third aspect, in a sixth possible implementation manner, the detecting unit is configured to, when the service type information received by the receiving unit is L2VPN, start to perform failure detection on an end-to-end virtual link, wherein the end-to-end virtual link refers to a virtual link forming by splicing a virtual link between the slave node and the master node controlling the slave node and in the network virtualization system, with a virtual link between the master node controlling the slave node and a remote signaling gateway RSG and outside the network virtualization system;

the switching unit, is configured to, when the detecting unit detects that the main virtual link has failure and the backup virtual link has no failure, enable the slave node to switch to transmit the service data message on the backup virtual link, comprises: when detecting that the end-to-end virtual link where the main virtual link is located has failure and the end-to-end virtual link where the backup virtual link is located has no failure, switching, by the slave node, to transmit the service data message on the backup virtual link;

or, the detecting unit is configured to, when the service type information received by the receiving unit is L3VPN, start to perform failure detection on the virtual link in the network virtualization system, wherein the virtual link in the network virtualization system refers to a virtual link from the slave node to the master node and in the network virtualization system;

the switching unit, is configured to, when the detecting unit detects that the virtual link in the network virtualization system where the main virtual link is located has failure and the virtual link in the network virtualization system where the backup virtual link is located has no failure, enable the slave node to transmit the service data message on the backup virtual link.

In combination with the third aspect or the foregoing five possible implementation manners of the third aspect, in a seventh possible implementation manner, the detecting unit is configured to, when the service type information receiving the receiving unit is L2VPN, receive an enabling failure detection configuration command sent by the master node controlling the slave node through the control channel formed with the master node controlling the slave node, wherein the enabling failure detection configuration command is used for controlling the slave node to start to perform failure detection on an end-to-end virtual link, and the end-to-end virtual link refers to a virtual link forming by splicing a virtual link between the slave node and the master node controlling the slave node and in the network virtualization system, with a virtual link between the master node controlling the slave node and an RSG and outside the network virtualization system; and start to perform the failure detection on the end-to-end virtual link according to the enabling failure detection configuration command received by the receiving unit;

the switching unit is configured to, when the detecting unit detects that the end-to-end virtual link where the main virtual link is located has failure and the end-to-end virtual link where the backup virtual link is located has no failure, enable the slave node to transmit the service data message on the backup virtual link.

In a fourth aspect, the embodiments of the present disclosure provide a master node, wherein the master node is applied to a network virtualization system based on control and forwarding separation, the network virtualization system includes master nodes and a slave node, the slave node is controlled by a pair of mutually main-backup master nodes, the pair of mutually main-backup master nodes includes a main master node and a backup master node, a first virtual link is arranged between the slave node and the main master node controlling the slave node, a second virtual link is arranged between the slave node and the backup master node controlling the slave node, and the master node comprises:

a first obtaining unit, configured to obtain service type information, wherein the service type information comprises L2VPN and L3VPN; and a sending unit, configured to send the service type information obtained by the first obtaining unit to the slave node controlled by the master node through a control channel between the master node and the slave node controlled by the master node, for enabling the slave node controlled by the master node to determine a main virtual link and a backup virtual link according to the received service type information, and perform failure detection on the determined main virtual link and the backup virtual link.

In combination with the fourth aspect, in a first possible implementation manner, the first obtaining unit comprises:

an establishing module, configured to establish a corresponding virtual remote logical interface for an external interface of the slave node controlled by the master node, wherein the external interface refers to an interface of the slave node controlled by the master node, which is connected with a network device outside the network virtualization system based on control and forwarding separation;

a configuration module, configured to configure a service outside the network virtualization system based on control and forwarding separation on the virtual remote logical interface established by the establishing module; and an obtaining module, configured to obtain service type information corresponding to the configured service.

In combination with the first possible implementation manner of the fourth aspect, in a second possible implementation manner, the sending unit is further configured to send an enabling failure detection configuration command to the slave node controlled by the master node, for enabling the slave node controlled by the master node to start to perform failure detection on an end-to-end virtual link according to the enabling failure detection configuration command; wherein the enabling failure detection configuration command is used for controlling the slave node controlled by the master node to start to perform the failure detection on the end-to-end virtual link, and the end-to-end virtual link refers to a virtual link forming by splicing a virtual link between the slave node and the master node and in the network virtualization system, with a virtual link between the master node and an RSG and outside the network virtualization system.

In combination with the fourth aspect or the foregoing two possible implementation manners of the second disclosure, in the third possible implementation manner, the master node further comprises:

a receiving unit, configured to receive state information sent by an RSG, wherein the state information comprises Active and Standby;

the sending unit, is configured to send the state information received by the receiving unit to the slave node controlled by the master node through the control channel formed with the slave node controlled by the master node.

In combination with the fourth aspect or the foregoing two possible implementation manners of the second disclosure, in a fourth possible implementation manner, the master node further comprises:

a setting unit, configured to, when the master node detects that the interface routing corresponding to the slave node controlled by the master node has failure, reduce a routing priority level of the virtual remote logical interface located on the master node of the slave node controlled by the master node; and a second obtaining unit, configured to obtain a routing priority level of the virtual remote logical interface on the other master node corresponding to the slave node controlled by the master node, wherein the other master node and the master node are of a main-backup relationship mutually; and the sending unit is configured to, when determining that the routing priority level of the virtual remote logical interface located on the master node of the slave node controlled by the master node is lower than the routing priority level of the virtual remote logical interface on the other master node corresponding to the slave node controlled by the master node, carry a Standby state in interface routing state information, and send the Standby state to the slave node controlled by the master node through the control channel formed with the slave node controlled by the master node.

In a fifth aspect, the present disclosure provides a network virtualization system, including master nodes and a slave node, the slave node is controlled by a pair of mutually main-backup master nodes, the pair of mutually main-backup master nodes includes a main master node and a backup master node, a first virtual link is arranged between the slave node and the main master node controlling the slave node, and a second virtual link is arranged between the slave node and the backup master node controlling the slave node;

wherein, the master node obtains service type information, and the service type information comprises L2VPN and L3VPN; the service type information is sent to the slave node controlled by the master node through a control channel between the master node and the slave node controlled by the master node;

the slave node receives the service type information sent by the master node controlling the slave node through the control channel between the master node controlling the slave node and the slave node, wherein the service type information comprises L2VPN and L3VPN; determines a main virtual link and a backup virtual link according to the service type information, wherein the main virtual link is a virtual link of the first virtual link and the second virtual link, the main virtual link is a virtual link used for transmitting a service data message, and the backup virtual link is the other virtual link rather than the main virtual link of the first virtual link and the second virtual link; detects whether the main virtual link and the backup virtual link have failure; when detecting that the main virtual link has failure and the backup virtual link has no failure, switches to transmit the service data message on the backup virtual link.

The embodiments of the present disclosure provide a method and a device for protecting service reliability and a network virtualization system. In the network virtualization system based on control and forwarding separation, the master node having a control function obtains the current service type information and notifies the slave node of the current service type information, for enabling the slave node to determine the main virtual link and the backup virtual link according to the service type information and perform the failure detection, and when detecting that the main virtual link has failure and the backup virtual link has no failure, the service data message is switched to be transmitted on the backup virtual link, to ensure non-interrupted transmission of the service data message in the brand-new system architecture provided by the present disclosure, so as to ensure the service reliability.

BRIEF DESCRIPTION OF DRAWINGS

To illustrate technical solutions in the embodiments of the present disclosure or in the prior art more clearly, a brief introduction on the accompanying drawings which are needed in the description of the embodiments or the prior art is given below. Apparently, the accompanying drawings in the description below are merely some of the embodiments of the present disclosure, based on which other drawings may be obtained by those of ordinary skill in the art without any creative effort.

DESCRIPTION OF EMBODIMENTS

A clear and complete description of technical solutions in the embodiments of the present disclosure will be given below, in combination with the accompanying drawings in the embodiments of the present disclosure. Apparently, the embodiments described below are merely a part, but not all, of the embodiments of the present disclosure. All of the other embodiments, obtained by those of ordinary skill in the art based on the embodiments of the present disclosure without any creative effort, fall into the protection scope of the present disclosure.

Figure 1:
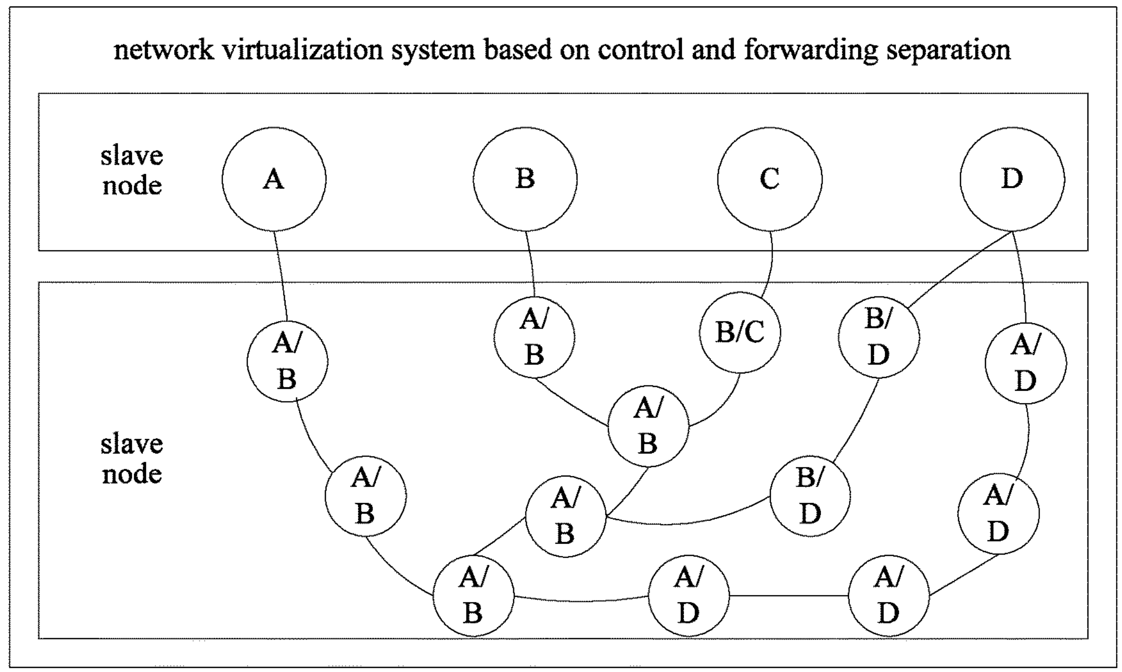
FIG. 1 is a schematic diagram of architecture of a network virtualization system based on control and forwarding separation provided by an embodiment of the present disclosure.

The present disclosure provides a network virtualization system based on control and forwarding separation. FIG. 1 is a schematic diagram of solid architecture of the system, the network virtualization system includes multiple master nodes (in FIG. 1, there are four master nodes in total, namely, A, B, C and D master nodes) and multiple slave nodes (in FIG. 1, there are 13 slave nodes in total), and the master nodes and the slave nodes may be connected according to the connecting manner as shown in FIG. 1 via a practical physical channel for commutation. Only the master node may be provided with a control function and a forwarding function, while the slave node only has the forwarding function. Of course, for convenience of control, the control function of each master node may be integrated in the same high level device to be uniformly managed.

Each slave node is controlled by a pair of mutually main-backup master nodes, which is expressed as A/B, B/C, B/D and A/D in FIG. 1. The relationship respectively expresses that the slave node is controlled by the master nodes A and B, the master nodes B and C, the master nodes B and D and the master nodes A and D. The pair of mutually main-backup master nodes includes a main master node and a backup master node, a first virtual link is arranged between the slave node and the main master node controlling the slave node, and a second virtual link is arranged between the slave node and the backup master node controlling the slave node. Both the first virtual link and the second virtual link are virtual logic channels, which are not shown in FIG. 1. Wherein, the forwarding priority level of the first virtual link may be initialized to be higher than the forwarding priority level of the second virtual link, so that when the slave node determines the current service type for initializing main and backup virtual links, the first virtual link may be preferably selected as the main virtual link and the second virtual link is selected as the backup virtual link. Of course, this initial setting may be additionally set according to actual demands. In the network virtualization system, it is not limited that each slave node must be provided with an independent main master node and an independent backup master node, that is, the same master node may both serve as the main master node of one slave node and serve as the back master node of another slave node.

Figure 2:
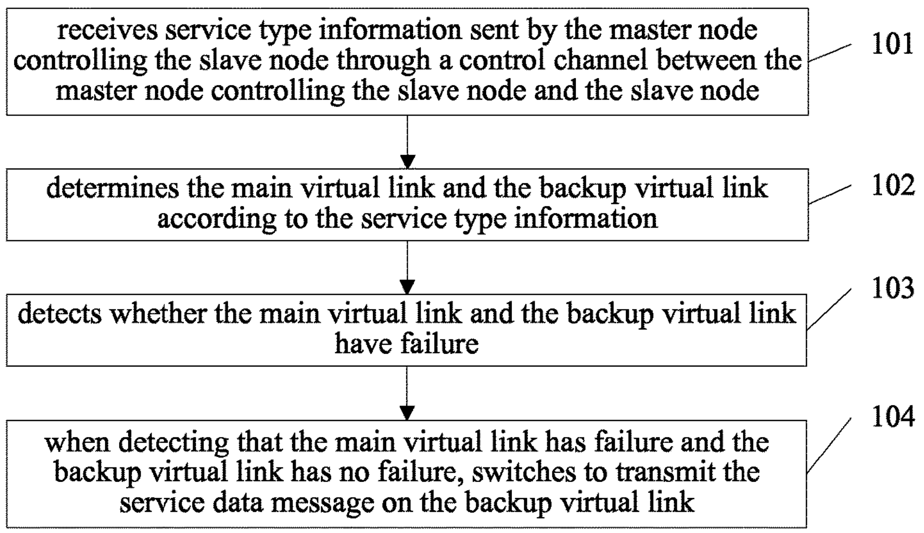
FIG. 2 is a flowchart of a method for protecting service reliability provided by an embodiment of the present disclosure.

Based on the above-mentioned network virtualization system based on control and forwarding separation, the embodiment of the present disclosure provides a method for protecting service reliability, as shown in FIG. 2, the method may be achieved by the slave node, including:

101. the slave node receives service type information sent by the master node controlling the slave node through a control channel between the master node controlling the slave node and the slave node.

Wherein the service type information includes L2VPN (layer 2 virtual private network, layer 2 virtual private network) and L3VPN (layer 3 virtual private network, layer 3 virtual private network).

102. The slave node determines the main virtual link and the backup virtual link according to the service type information.

Wherein the main virtual link is a virtual link in the first virtual link and the second virtual link, the main virtual link is a virtual link used for transmitting a service data message, and the backup virtual link is the other virtual link excluding the main virtual link in the first virtual link and the second virtual link.

It is worthy of being noted that, for convenience of subsequent work of the slave node, in the embodiment, the first virtual link is generally marked as the main virtual link by an active state Active, and the second virtual link is marked as the backup virtual link by a standby state Standby.

Aiming at different kinds of service type information, the embodiment of the present disclosure provides corresponding specific implementation manners of how to achieve step 102 and determine the main virtual link and the backup virtual link according to the service type information, which are specifically as follows:

aiming at the L2VPN service type information, the embodiment of the present disclosure provides two specific implementation manners, including:

The first implementation manner: the first virtual link is set as the main virtual link, and the second virtual link is set as the backup virtual link.

The second implementation manner: the main virtual link and the backup virtual link are determined according to the state information respectively sent by the main master node controlling the slave node and the backup master node controlling the slave node.

The first implementation manner aiming at L2VPN may be generally used as initial setting and is applied to the networking stage of the network virtualization system. The second implementation manner aiming at L2VPN may be applied at various operation stages of the network virtualization system.

Figure 3:
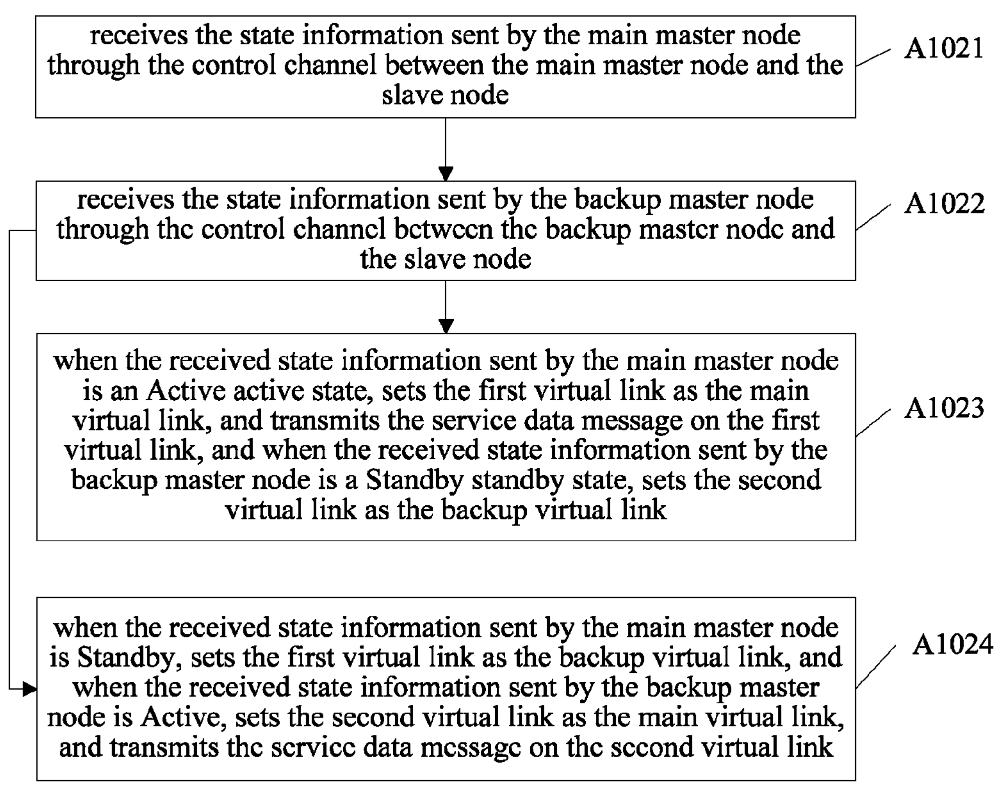
FIG. 3 is a flowchart of another method for protecting service reliability provided by an embodiment of the present disclosure.

Wherein, the specific implementation steps of the above-mentioned second implementation manner aiming at L2VPN may refer to the flow of the method as shown in FIG. 3, and specifically include:

A1021. the slave node receives the state information sent by the main master node through the control channel between the main master node and the slave node.

Wherein, the control channel between the main master node and the slave node is another channel independent from a service data channel between the main master node and the slave node.

A1022. The slave node receives the state information sent by the backup master node through the control channel between the backup master node and the slave node. And implements A1023 or A1024.

Wherein, the control channel between the backup master node and the slave node is another channel independent from the service data channel between the backup master node and the slave node.

A1023. When the received state information sent by the main master node is an Active active state, the slave node sets the first virtual link as the main virtual link, and transmits the service data message on the first virtual link, and when the received state information sent by the backup master node is a Standby standby state, sets the second virtual link as the backup virtual link.

A1024, When the received state information sent by the main master node is Standby, the slave node sets the first virtual link as the backup virtual link, and when the received state information sent by the backup master node is Active, sets the second virtual link as the main virtual link, and transmits the service data message on the second virtual link.

In the above-mentioned steps A1023 and A1024, the Active active state is used for expressing that the master node sending the state information is at a normal operation state. The Standby standby state is used for expressing that the slave node sending the state information is at a pause state.

Aiming at the L3VPN service type information, the embodiment of the present disclosure provides two specific implementation manners, including:

The first implementation manner: the slave node sets the first virtual link as the main virtual link and sets the second virtual link as the backup virtual link.

The second implementation manner: the slave node determines the main virtual link and the backup virtual link according to the interfere routing state information respectively sent by the main master node controlling the slave node and the backup master node controlling the slave node.

Wherein, the interface routing state information refers to routing information of a virtual remote logical interface having a corresponding relationship with an external interface of the slave node and located on the main master node or the backup master node, and the external interface refers to an interface of the slave node, which is connected with other network devices outside the network virtualization system based on control and forwarding separation.

The first implementation manner aiming at L3VPN may be generally used as initial setting and is applied to the networking stage of the network virtualization system. The second implementation manner aiming at L3VPN may be applied at various operation stages of the network virtualization system, of course, in the various operation stages of the network virtualization system in operating L3VPN, the configuration of the main virtual link and the backup virtual link may be kept invariable according to the initial setting.

Figure 4:
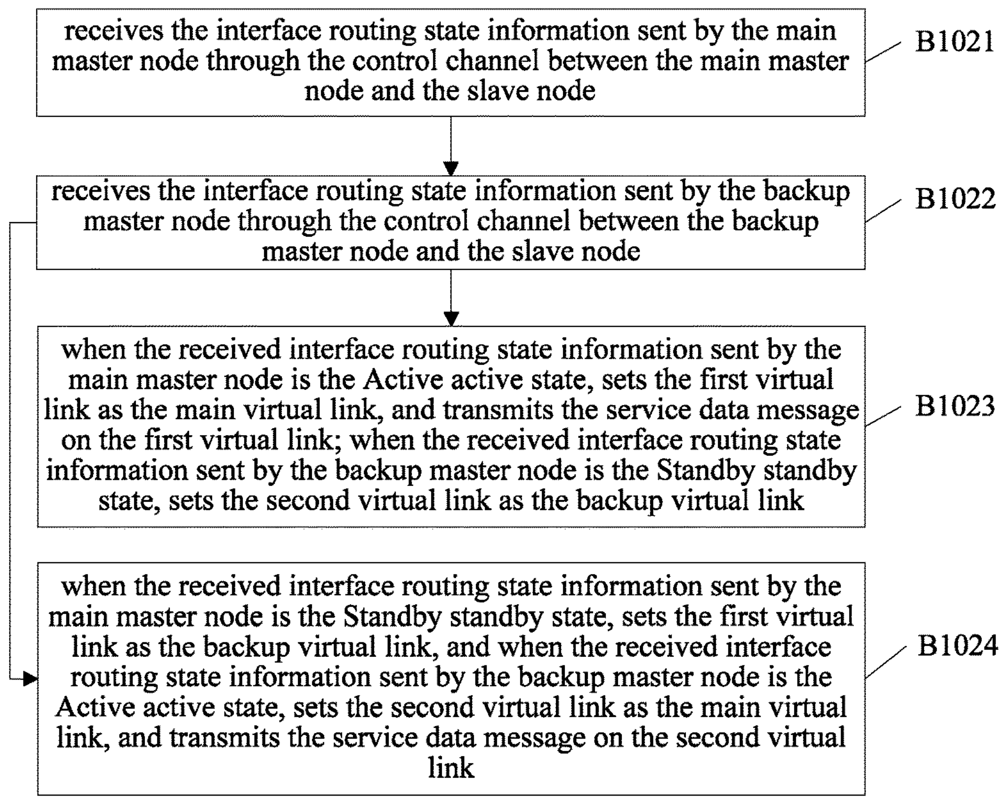
FIG. 4 is a flowchart of another method for protecting service reliability provided by an embodiment of the present disclosure.

Wherein, the specific implementation steps of the above-mentioned second implementation manner aiming at L3VPN may refer to the flow of the method as shown in FIG. 4, and specifically include:

B1021. the slave node receives the interface routing state information sent by the main master node through the control channel between the main master node and the slave node.

B1022. The slave node receives the interface routing state information sent by the backup master node through the control channel between the backup master node and the slave node. And implements Step B1023 or step B1024.

B1023. When the received interface routing state information sent by the main master node is the Active active state, the slave node sets the first virtual link as the main virtual link, and transmits the service data message on the first virtual link; when the received interface routing state information sent by the backup master node is the Standby standby state, the slave node sets the second virtual link as the backup virtual link.

Wherein, it is worthy of being noted that, when the interface routing state information of a main master node is the Active active state, it expresses that the routing priority level of the virtual remote logical interface located on the main master node is higher than the routing priority level of the virtual remote logical interface on the backup master node corresponding to the main master node.

When the interface routing state information of a backup master node is the Standby standby state, it expresses that the routing priority level of the virtual remote logical interface located on the backup master node is lower than the routing priority level of the virtual remote logical interface on the main master node corresponding to the backup master node.

B1024. When the received interface routing state information sent by the main master node is the Standby standby state, the slave node sets the first virtual link as the backup virtual link, and when the received interface routing state information sent by the backup master node is the Active active state, sets the second virtual link as the main virtual link, and transmits the service data message on the second virtual link.

103. The slave node detects whether the main virtual link and the backup virtual link have failure.

Wherein, the method of the slave node for detecting whether the main virtual link and the backup virtual link have failure or not may be achieved by performing BFD (Bidirectional Forwarding Detection, bidirectional forwarding detection) detection on the main virtual link and the backup virtual link.

104. When detecting that the main virtual link has failure and the backup virtual link has no failure, the slave node switches to transmit the service data message on the backup virtual link.

The embodiment of the present disclosure provides a method for protecting service reliability. In the network virtualization system based on control and forwarding separation provided by the present disclosure, the slave node detects the determined main virtual link and the backup virtual link, and when detecting that the main virtual link has failure and the backup virtual link has no failure, the service data message is switched to be transmitted on the backup virtual link, to ensure non-interrupted transmission of the service data message in the brand-new system architecture provided by the present disclosure, so as to ensure the service reliability.

Figure 5:
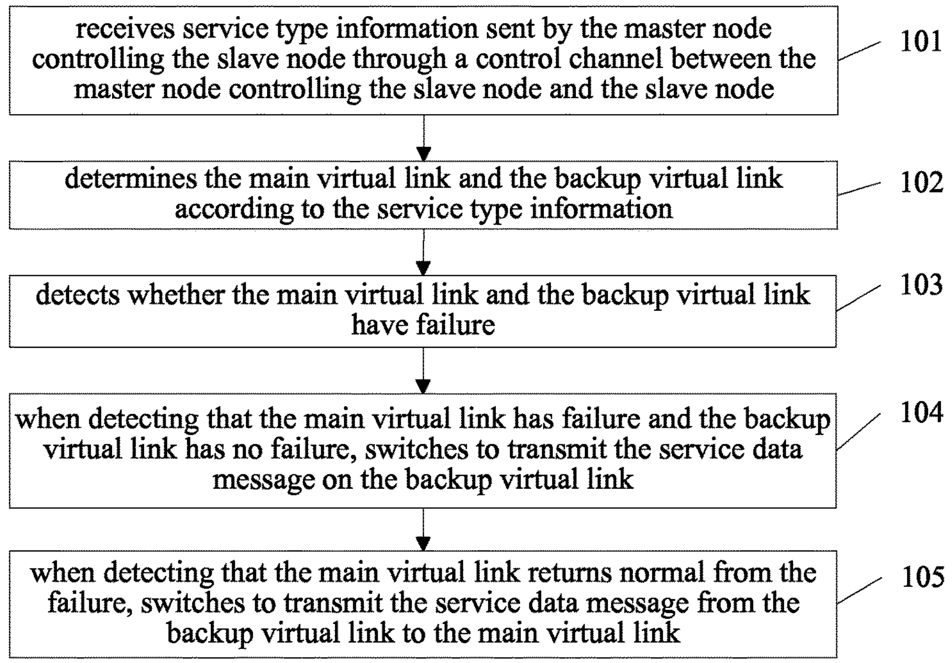
FIG. 5 is a flowchart of another method for protecting service reliability provided by an embodiment of the present disclosure.

It is worthy of being further noted that, as shown in FIG. 5, after step 104 is implemented, step 105 may also be implemented, when detecting that the main virtual link returns normal from the failure, the slave node switches to transmit the service data message from the backup virtual link to the main virtual link.

Further, when the above-mentioned step 105 is implemented, the slave node does not need to be agreed by the main master node or the backup master node and may directly switch the main and backup virtual links according to its own judgment, but when the main virtual link is recovered, the backup virtual link is at a work state, thus the two virtual links may simultaneously transmit a downlink service data message.

In order to ensure that the service data message is not interrupted or lost during transmission, when the transmission quantity of the service data message is small, the slave node may directly switch to transmit the service data message on the main virtual link.

When the transmission quantity of the service data message is large, within a preset time, the slave node simultaneously receives a downlink service data message transmitted on the main virtual link and the backup virtual link, and transmits an uplink service data message on the backup virtual link, and after the preset time, the slave node switches to transmit both the uplink service data message and the downlink service data message on the main virtual link.

Wherein, the preset time is an empirical value, for example, 300 ms and the like, may be preset.

It is worthy of being noted that, when step 103 is implemented, the embodiment of the present disclosure further provides the following three failure detection starting methods aiming at different kinds of service type information, including:

the first starting method: when the service type information is L2VPN, the slave node starts to perform failure detection on an end-to-end virtual link, wherein the end-to-end virtual link refers to a virtual link forming by splicing a virtual link between the slave node and the master node controlling the slave node and in the network virtualization system, with a virtual link between the master node controlling the slave node and a remote signaling gateway RSG and outside the network virtualization system.

Correspondingly, in step 104, when detecting that the main virtual link has failure and the backup virtual link has no failure, the implementation method of the slave node for switching to transmit the service data message on the backup virtual link includes: when detecting that the end-to-end virtual link where the main virtual link is located has failure and the end-to-end virtual link where the backup virtual link is located has no failure, the slave node switches to transmit the service data message on the backup virtual link.

The second starting method: when the service type information is L3VPN, the slave node starts to perform failure detection on the virtual link in the network virtualization system, wherein the virtual link in the network virtualization system refers to a virtual link from the slave node to the master node and in the network virtualization system.

Correspondingly, in step 104, when detecting that the main virtual link has failure and the backup virtual link has no failure, the implementation method of the slave node for switching to transmit the service data message on the backup virtual link includes: when detecting that the virtual link in the network virtualization system where the main virtual link is located has failure and the virtual link in the network virtualization system where the backup virtual link is located has no failure, the slave node switches to transmit the service data message on the backup virtual link.

The third starting method: when the service type information is L2VPN, the slave node receives an enabling failure detection configuration command sent by the master node controlling the slave node through the control channel formed with the master node controlling the slave node, wherein the enabling failure detection configuration command is used for controlling the slave node to start to perform failure detection on an end-to-end virtual link, and the end-to-end virtual link refers to a virtual link forming by splicing a virtual link between the slave node and the master node and in the network virtualization system, with a virtual link between the master node and an RSG and outside the network virtualization system; the slave node starts to perform failure detection on the end-to-end virtual link according to the enabling failure detection configuration command.

Correspondingly, in step 104, when detecting that the main virtual link has failure and the backup virtual link has no failure, the implementation method of the slave node for switching to transmit the service data message on the backup virtual link includes: when detecting that the end-to-end virtual link where the main virtual link is located has failure and the end-to-end virtual link where the backup virtual link is located has no failure, the slave node switches to transmit the service data message on the backup virtual link.

Figure 6:
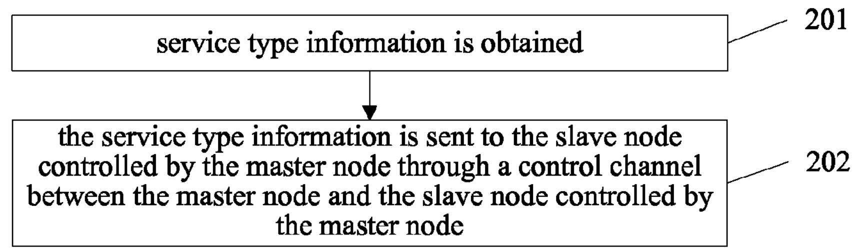
FIG. 6 is a flowchart of another method for protecting service reliability provided by an embodiment of the present disclosure.

Based on the above-mentioned network virtualization system based on control and forwarding separation, the embodiment of the present disclosure provides a method for protecting service reliability, as shown in FIG. 6, the method may be implemented by a master node, including:

201. service type information is obtained.

Wherein, the service type information includes L2VPN and L3VPN.

Figure 7:
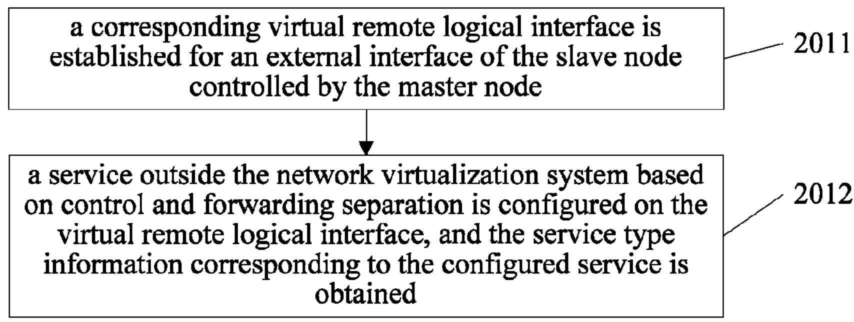
FIG. 7 is a flowchart of another method for protecting service reliability provided by an embodiment of the present disclosure.

Wherein, the method for obtaining the service type information by the master node may be achieved by the flow of the method as shown in FIG. 7, specifically includes:

2011. a corresponding virtual remote logical interface is established for an external interface of the slave node controlled by the master node.

Wherein, the external interface refers to an interface of the slave node controlled by the master node, which is connected with a network device outside the network virtualization system based on control and forwarding separation.

2012. A service outside the network virtualization system based on control and forwarding separation is configured on the virtual remote logical interface, and the service type information corresponding to the configured service is obtained.

202. The service type information is sent to the slave node controlled by the master node through a control channel between the master node and the slave node controlled by the master node, for enabling the slave node controlled by the master node to determine a main virtual link and a backup virtual link according to the received service type information, and perform failure detection on the determined main virtual link and the backup virtual link.

The embodiment of the present disclosure provides a method for protecting service reliability, in the network virtualization system based on control and forwarding separation provided by the present disclosure, the master node having a control function obtains the current service type information and notifies the slave node of the current service type information, for enabling the slave node to determine the main virtual link and the backup virtual link according to the service type information and perform the failure detection, and when detecting that the main virtual link has failure and the backup virtual link has no failure, the service data message is switched to be transmitted on the backup virtual link, to ensure non-interrupted transmission of the service data message in the brand-new system architecture provided by the present disclosure, so as to ensure the service reliability.

Figure 8:
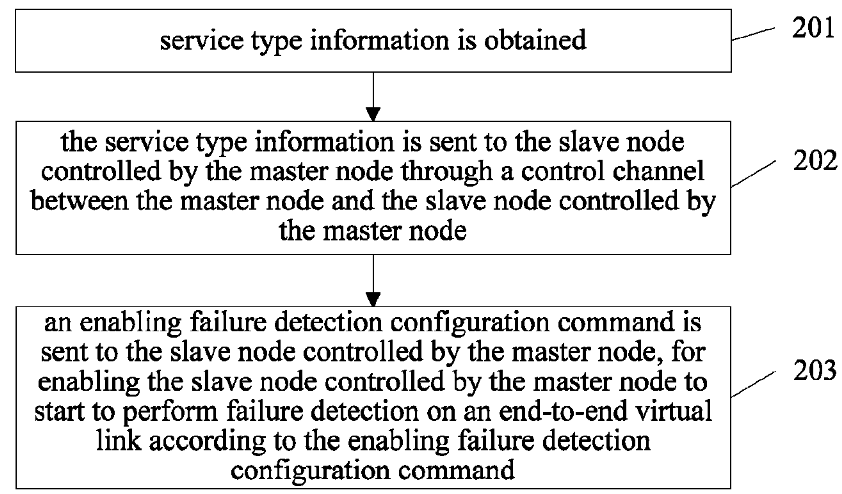
FIG. 8 is a flowchart of another method for protecting service reliability provided by an embodiment of the present disclosure.

Optionally, after step 202 is implemented, as shown in FIG. 8, the method provided by the embodiment of the present disclosure further includes:

203. an enabling failure detection configuration command is sent to the slave node controlled by the master node, for enabling the slave node controlled by the master node to start to perform failure detection on an end-to-end virtual link according to the enabling failure detection configuration command.

Wherein, the enabling failure detection configuration command is used for controlling the slave node controlled by the master node to start to perform the failure detection on the end-to-end virtual link, and the end-to-end virtual link refers to a virtual link forming by splicing a virtual link between the slave node controlled by the master node and the master node and in the network virtualization system, with a virtual link between the master node and an RSG and outside the network virtualization system.

By implementing step 203, the method provided by the embodiment of the present disclosure may be used for controlling the slave node to start the failure detection. It is worthy of being noted that, the step may also be set to be preferably completed by the main master node.

Figure 9:
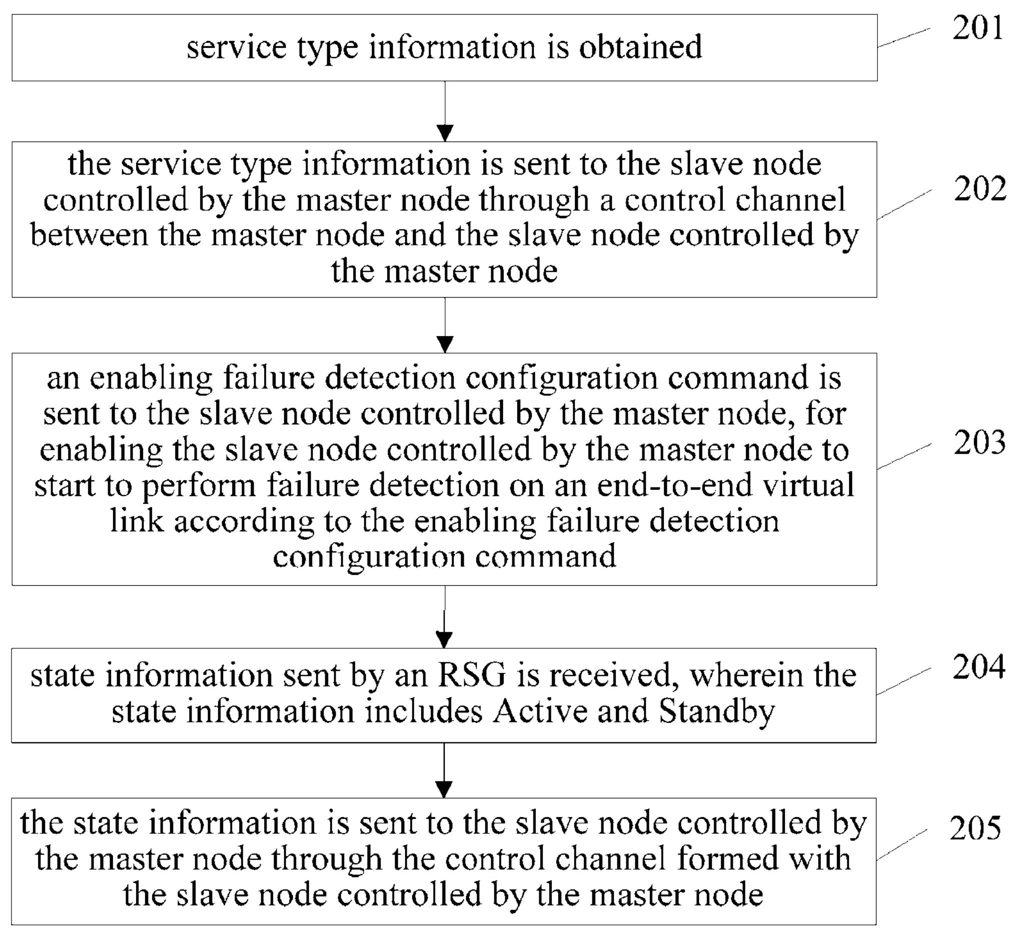
FIG. 9 is a flowchart of another method for protecting service reliability provided by an embodiment of the present disclosure.

Further, at the L2VPN service type, in order to respond to the problems occurring at the outside of the network virtualization system based on control and forwarding separation to ensure normal transmission of the service data message, as shown in FIG. 9, the method further includes:

204. the master node receives state information sent by an RSG, wherein the state information includes Active and Standby.

205. The state information is sent to the slave node controlled by the master node through the control channel formed with the slave node controlled by the master node.

Figure 10:
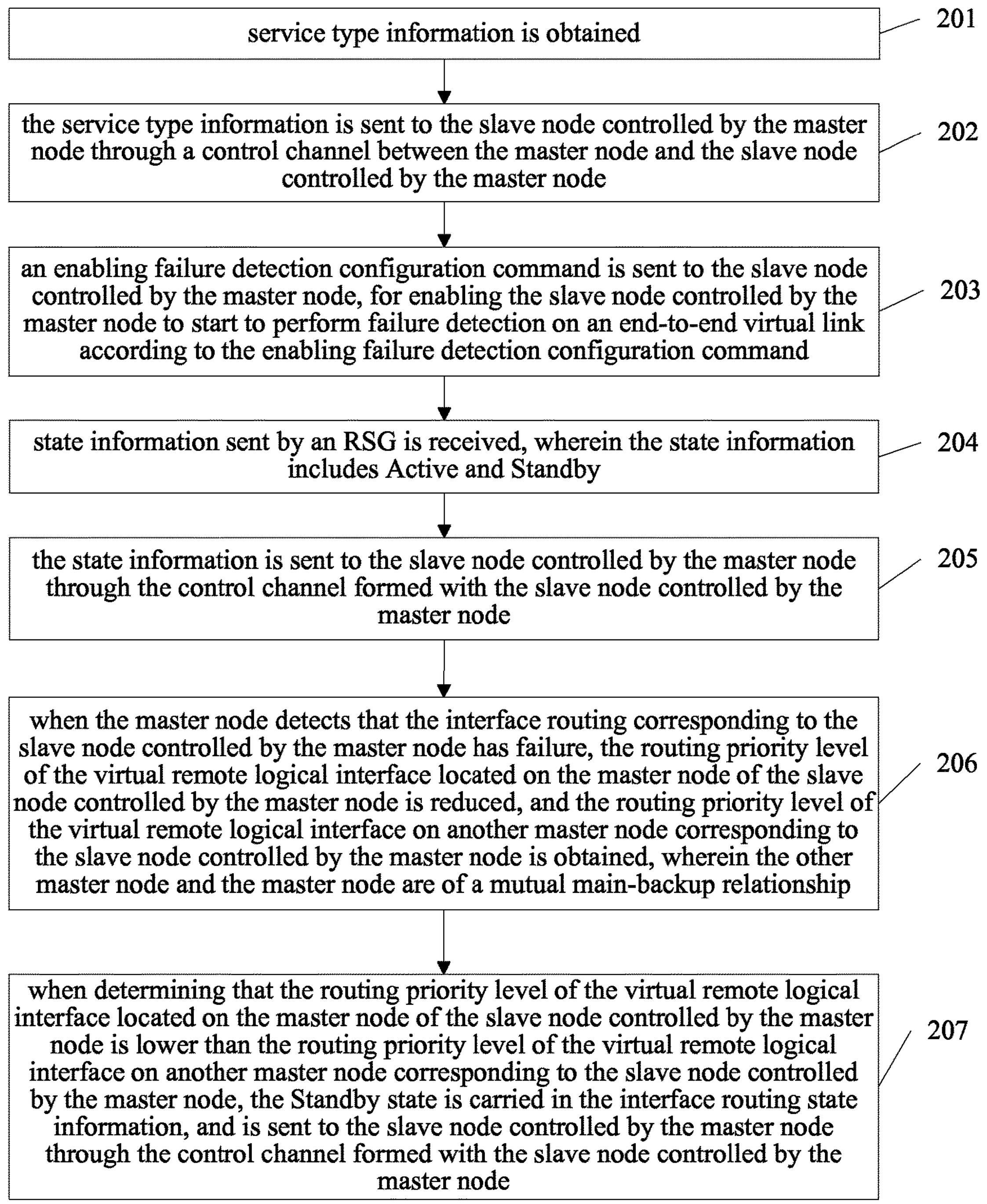
FIG. 10 is a flowchart of another method for protecting service reliability provided by an embodiment of the present disclosure.

Further, at the L3VPN service type, when a routing interface corresponding to the slave node controlled by the master node on the master node has failure, the slave node controlled by the master node needs to be notified, in order to ensure the slave node controlled by the master node to adjust the main and backup virtual links in time, as shown in FIG. 10, the method further includes:

206. when the master node detects that the interface routing corresponding to the slave node controlled by the master node has failure, the routing priority level of the virtual remote logical interface located on the master node of the slave node controlled by the master node is reduced, and the routing priority level of the virtual remote logical interface on another master node corresponding to the slave node controlled by the master node is obtained, wherein the other master node and the master node are of a mutual main-backup relationship.

Wherein, the master node may reduce the routing priority level by reducing a received corresponding routing weighted value.

207. When determining that the routing priority level of the virtual remote logical interface located on the master node of the slave node controlled by the master node is lower than the routing priority level of the virtual remote logical interface on another master node corresponding to the slave node controlled by the master node, the Standby state is carried in the interface routing state information, and is sent to the slave node controlled by the master node through the control channel formed with the slave node controlled by the master node.

In addition, thereafter, if detecting that the failure with the interface routing corresponding to the slave node is recovered, the master node may increase the routing priority level of the virtual remote logical interface located on the master node of the slave node, and the Active state is carried in the interface routing state information, and is sent to the slave node through the control channel formed with the slave node.

Figure 11:
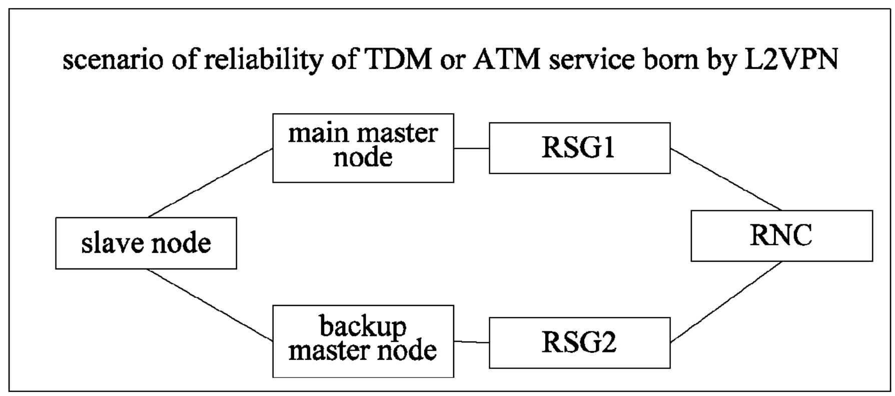
FIG. 11 is a schematic diagram of a scenario of reliability of TDM or ATM service born by L2VPN.
Figure 12:
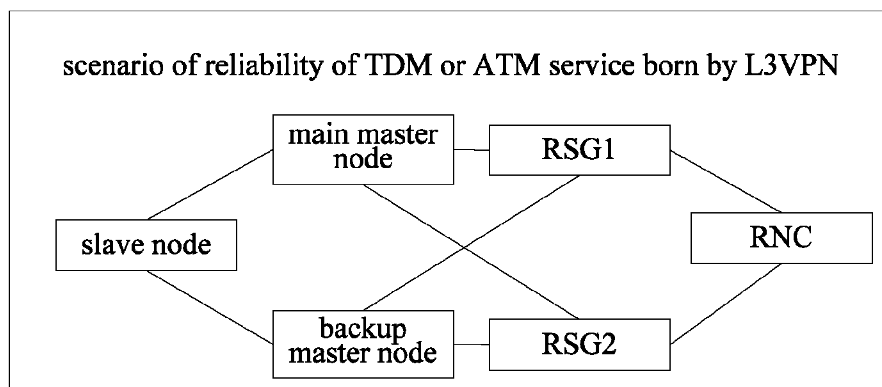
FIG. 12 is a schematic diagram of a scenario of reliability of ETH service born by L3VPN.

Based on the slave node method as shown in FIG. 2 to FIG. 5 and the master node method as shown in FIG. 6 to FIG. 10, the embodiment of the present disclosure respectively describes the technical solutions provided by the present disclosure in detail, in combination with the scenario of reliability of TDM or ATM service born by L2VPN as shown in FIG. 11 and the scenario of reliability of TDM or ATM service born by L3VPN as shown in FIG. 12.

In the scenario of reliability of TDM (time division multiplexing, time division multiplexing) or ATM (asynchronous transfer mode, asynchronous transfer mode) service born by L2VPN as shown in FIG. 11, a slave node, a main master node and a backup master node used for controlling the slave node, two RSGs (RSG1 and RSG 2 as shown in FIG. 11) and one RNC are arranged, wherein the slave node transmits service data with the main master node and the backup master node through a pseudo-wire, the main master node is connected with the RSG1 through the pseudo-wire, the backup master node is connected with the RSG2 through the pseudo-wire and the two RSGs are connected with the RNC.

In the scenario of reliability of ETH (ethernet, Ethernet) service born by L3VPN as shown in FIG. 12, a slave node, a main master node and a backup master node used for controlling the slave node, two RSGs (RSG1 and RSG 2 as shown in FIG. 12) and one RNC are arranged, wherein the slave node transmits service data with the main master node and the backup master node through a pseudo-wire, the main master node communicates with the RSG1 through the three-layer routing network, the backup master node communicates with the RSG2 through the three-layer routing network, and the two RSGs are connected with the RNC.

Figure 13:
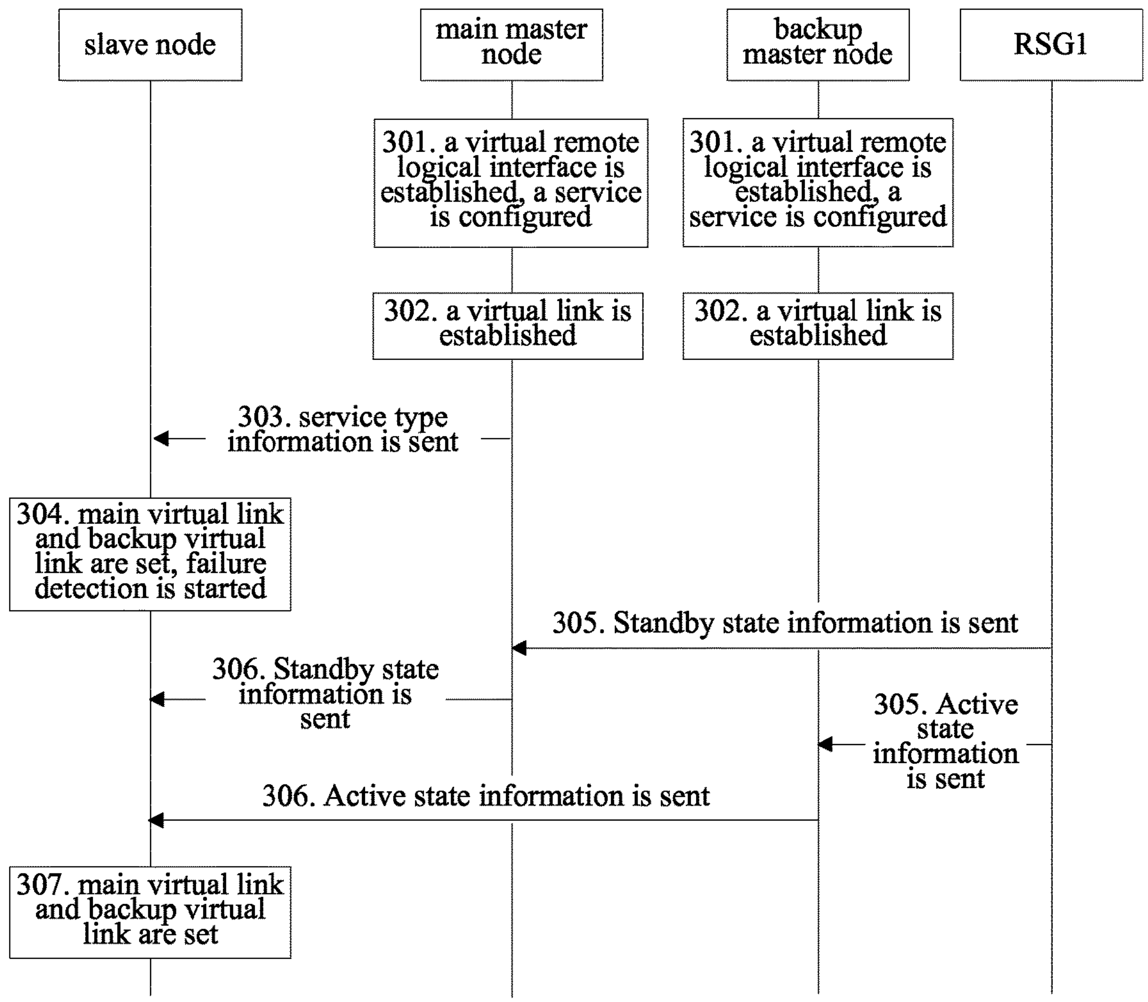
FIG. 13 is a flowchart of another method for protecting service reliability provided by an embodiment of the present disclosure.

In combination with the specific application scenario as shown in FIG. 11, the embodiment of the present disclosure provides a method for protecting service reliability, as shown in FIG. 13, including:

301. the main master node and the backup master node respectively establish a virtual remote logical interface for an external interface of the slave node and configure an L2VPN service at the outside of the network virtualization system on the virtual remote logical interface.

302. The main master node and the backup master node respectively establish a point-to-point virtual link between the virtual remote logical interface and the external interface of the slave node.

303. The main master node sends a service type to the slave node through a control channel between the main master node and the slave node.

304. The slave node sets the first virtual link as a main virtual link, sets the second virtual link as a backup virtual link, and starts to perform failure detection on the virtual link from the RSG1 to the main master node, the virtual link from the RSG2 to the backup master node, the virtual link from the main master node to the slave node and the virtual link from the backup virtual link to the slave node.

305. When detecting that the link with the RNC has failure, the RSG1 sends Standby state information to the main master node and sends Active state information to the backup master node.

306. After receiving the Standby state information, the main master node sends the Standby state information to the slave node through the control channel. After receiving the Active state information, the backup master node sends the Active state information to the slave node through the control channel.

307. After receiving the Standby state information sent by the main master node and the Active state information sent by the backup master node, the slave node sets the current main virtual link as the backup virtual link and sets the current backup virtual link as the main virtual link.

At this time, the uplink flow transmission way is as follows: the slave node transmits the received service data message to the backup master node. The backup master node sends the service data message to the RSG2 and sends the same to the RNC.

The downlink flow transmission way is as follows: the RSG2 receives the service data message sent by the RNC and sends the same to the backup master node, and the backup master node sends the service data message to the slave node.

It is worthy of being noted that, in the above-mentioned step 304, according to the service type L2VPN, the slave node directly starts to perform the failure detection on the virtual link from the RSG1 to the main master node, the virtual link from the RSG2 to the backup master node, the virtual link from the main master node to the slave node and the virtual link from the backup virtual link to the slave node. The embodiment of the present disclosure further provides a method, before 304 is implemented, the main master node may send an enabling failure detection configuration command to the slave node, and after receiving the command, the slave node starts the failure detection.

Figure 14:
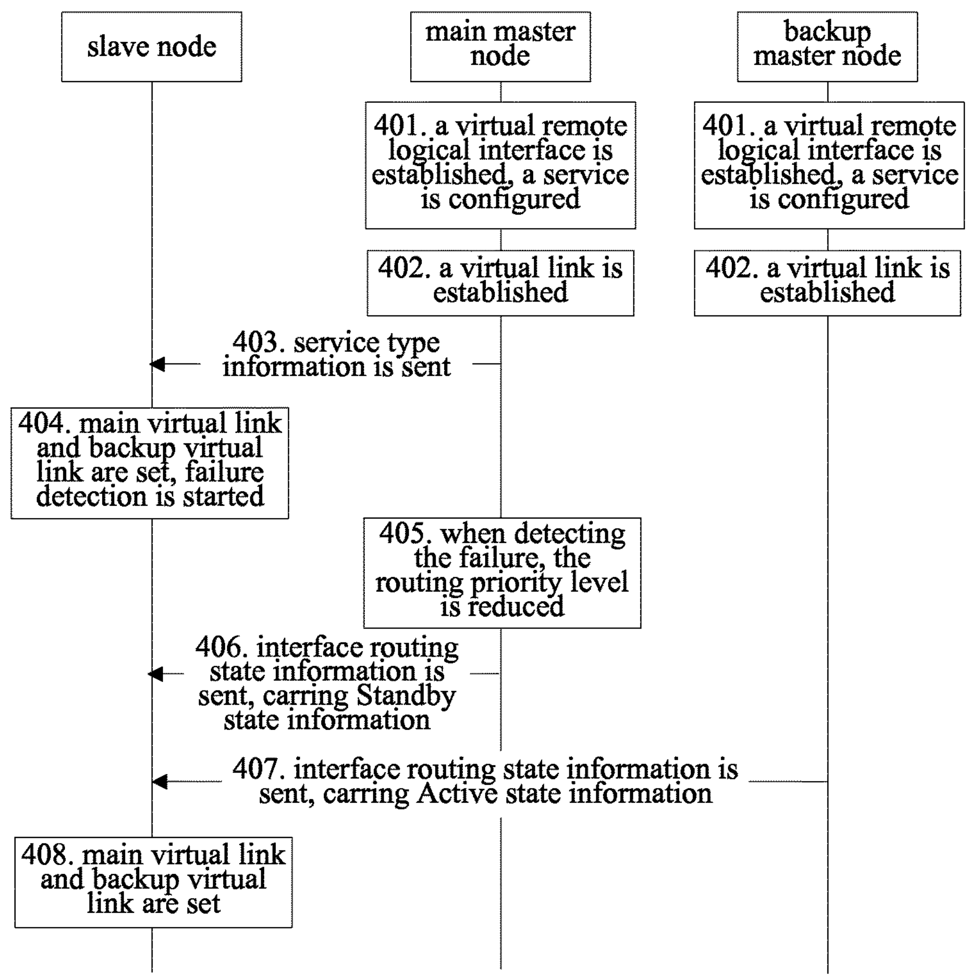
FIG. 14 is a flowchart of another method for protecting service reliability provided by an embodiment of the present disclosure.

In combination with the specific application scenario as shown in FIG. 12, the embodiment of the present disclosure provides a method for protecting service reliability, as shown in FIG. 14, including:

401. a virtual remote logical interface for an external interface of the slave node is respectively established on the main master node and the backup master node, and an L3VPN service outside the network virtualization system is configured on the virtual remote logical interface.

402. The main master node and the backup master node respectively establish a point-to-point virtual link between the virtual remote logical interface and the external interface of the slave node.

403. The main master node sends a service type to the slave node through a control channel between the main master node and the slave node.

At this time, the backup master node may also send the same service type information to the slave node, and the slave node still performs subsequent processing according to the service type information sent by the main master node.

404. The slave node sets the first virtual link as a main virtual link, sets the second virtual link as a backup virtual link, and starts to perform failure detection on the virtual link from the main master node to the slave node and the virtual link from the backup virtual link to the slave node.

405. When detecting that interface routing corresponding to the slave node has failure, the main master node reduces the routing priority level of the virtual remote logical interface between the slave node and the master node.

406. When determining that the reduced routing priority level is lower than the routing priority level of the virtual remote logical interface between the backup master node and the master node, a Standby state is carried in interface routing state information and is sent to the slave node through the control channel formed with the slave node.

407. When determining that the routing priority level of the virtual remote logical interface between the slave node and the mater node is lower than the routing priority level of the virtual remote logical interface between the backup master node and the master node, the backup master node carries an Active state in the interface routing state information and sends the same to the slave node through the control channel formed with the slave node.

408. The first virtual link is set as the backup virtual link, the second virtual link is set as the main virtual link, and the service data message is transmitted on the second virtual link.

At this time, the uplink flow transmission way is as follows: the slave node transmits the received service data message to the backup master node. The backup master node sends the service data message to the RSG1 or the RSG2 through a three-layer routing network and sends the same to the RNC.

The downlink flow transmission way is as follows: the RSG1 or the RSG2 receives the service data message sent by the RNC and sends the received service data message to the backup master node through the three-layer routing network, and the backup master node sends the service data message to the slave node.

It is worthy of being noted that, in step 407, when determining that the routing priority level of the main virtual link is lower than the routing priority level of the backup virtual link, the current main virtual link may not be set as the backup virtual link, the current backup virtual link may not be set as the main virtual link, and only an uplink service data message is sent to the backup master node.

After step 407 is implemented, if the interface routing corresponding to the slave node on the main master node is recovered, the main master node will reset the routing priority level of the interface routing, for enabling the routing priority level to be higher than or equal to the routing priority level on the backup master node again, but in the process, such information as the routing list of the three-layer routing network between the master node and the RSG needs to be re-updated according to the routing priority level of the main master node, and this process needs a period of time. Therefore, to ensure non-interruption of the downlink service data message, a step of switching back the transmission path of the service data message is provided herein, including:

switching back the transmission path of the uplink service data message: after waiting for 300 s, the slave node switches to transmit the uplink service data message from the backup master node to the main master node;

switching back the transmission path of the downlink service data message: the slave node simultaneously receives the downlink service data message sent by the main master node and the backup master node. 300 s later, the slave node merely receives the downlink service data message sent by the main master node.

The embodiment of the present disclosure provides a method for protecting service reliability, in the network virtualization system based on control and forwarding separation provided by the present disclosure, the master node having a control function obtains the current service type information and notifies the slave node of the current service type information, for enabling the slave node to determine the main virtual link and the backup virtual link according to the service type information and perform the failure detection, and when detecting that the main virtual link has failure and the backup virtual link has no failure, the service data message is switched to be transmitted on the backup virtual link, to ensure non-interrupted transmission of the service data message in the brand-new system architecture provided by the present disclosure, so as to ensure the service reliability.

Figure 15:
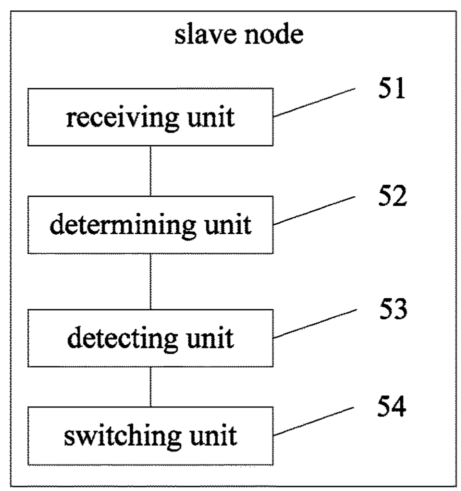
FIG. 15 is a block diagram of the composition of a slave node provided by an embodiment of the present disclosure.

The embodiment of the present disclosure provides a slave node, which may be used for achieving the flows of the methods of all slave node sides as shown in FIG. 2 to FIG. 14 and is specifically applied to a network virtualization system based on control and forwarding separation, the network virtualization system includes master nodes and the slave node, the slave node is controlled by a pair of mutually main-backup master nodes, the pair of mutually main-backup master nodes includes a main master node and a backup master node, a first virtual link is arranged between the slave node and the main master node controlling the slave node, a second virtual link is arranged between the slave node and the backup master node controlling the slave node, wherein, as shown in FIG. 15, the slave node includes:

a receiving unit 51, configured to receive service type information sent by the master node through a control channel between the master node and the slave node, wherein the service type information includes L2VPN and L3VPN;

a determining unit 52, configured to determine a main virtual link and a backup virtual link according to the service type information received by the receiving unit 51, wherein the main virtual link is a virtual link in the first virtual link and the second virtual link, the main virtual link is a virtual link used for transmitting a service data message, and the backup virtual link is the other virtual link excluding the main virtual link in the first virtual link and the second virtual link;

a detecting unit 53, configured to detect whether the main virtual link and the backup virtual link determined by the determining unit 52 have failure or not; and a switching unit 54 configured to, when the detecting unit 53 detects that the main virtual link has failure and the backup virtual link has no failure, switch to transmit the service data message on the backup virtual link.

Optionally, the determining unit 52 is configured to, when the service type is L2VPN, set the first virtual link as the main virtual link and set the second virtual link as the backup virtual link; the determining unit is further configured to, when the service type is L2VPN, determine the main virtual link and the backup virtual link according to the state information respectively sent by the main master node controlling the slave node and the backup master node controlling the slave node; the determining unit is further configured to, when the service type is L3VPN, set the first virtual link as the main virtual link and set the second virtual link as the backup virtual link; the determining unit is further configured to, when the service type is L3VPN, determine the main virtual link and the backup virtual link according to the interface routing state information respectively sent by the main master node controlling the slave node and the backup master node controlling the slave node, wherein the interface routing state information refers to the routing state information of a virtual remote logical interface having a corresponding relationship with an external interface of the slave node and located on the main master node or the backup master node, and the external interface refers to an interface of the slave node, which is connected with a network device at the outside of a network virtualization system based on control and forwarding separation.

Figure 16:
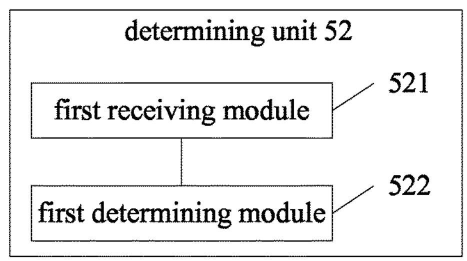
FIG. 16 is a block diagram of the composition of another slave node provided by an embodiment of the present disclosure.

Optionally, as shown in FIG. 16, the determining unit 52 includes:

a first receiving module 521, configured to enable the slave node to receive the state information sent by the main master node through the control channel between the main master node and the slave node.

The first receiving module 521 is further configured to enable the slave node to receive the state information sent by the backup master node through the control channel between the backup master node and the slave node.

A determining module 522 configured to, when the state information sent by the main master node and received by the first receiving module 521 is an Active active state, enable the slave node to set the first virtual link as the main virtual link, and transmit the service data message on the first virtual link, and when the state information sent by the backup master node and received by the first receiving module 521 is a Standby standby state, set the second virtual link as the backup virtual link; the determining module is further configured to, when the state information sent by the main master node and received by the first receiving module 521 is Standby, set the first virtual link as the backup virtual link, and when the state information sent by the backup master node and received by the first receiving module 521 is Active, set the second virtual link as the main virtual link, and transmit the service data message on the second virtual link.

Figure 17:
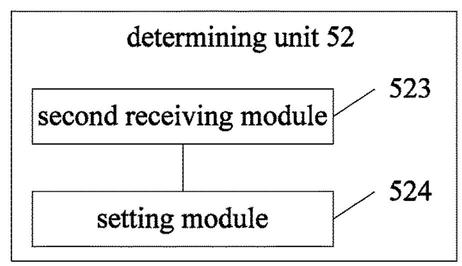
FIG. 17 is a block diagram of the composition of another slave node provided by an embodiment of the present disclosure.

Optionally, as shown in FIG. 17, the determining unit 52 includes:

a second receiving module 523, configured to enable the slave node to receive the interface routing state information sent by the main master node through the control channel between the main master node and the slave node.

The second receiving module 523 is further configured to enable the slave node to receive the interface routing state information sent by the backup master node through the control channel between the backup master node and the slave node.

A setting module 524 configured to, when the interface routing state information sent by the main master node and received by the second receiving module 523 is the Active active state, enable the slave node to set the first virtual link as the main virtual link, and transmit the service data message on the first virtual link, and when the interface routing state information sent by the backup master node and received by the second receiving module 523 is the Standby standby state, set the second virtual link as the backup virtual link; the setting module is further configured to, when the interface routing state information sent by the main master node and received by the second receiving module is the Standby standby state, set the first virtual link as the backup virtual link, and when the interface routing state information sent by the backup master node and received by the second receiving module 523 is the Active active state, set the second virtual link as the main virtual link, and transmit the service data message on the second virtual link.

Optionally, the switching unit 54 is further configured to, when the detecting unit detects that the failure of the main virtual link is recovered, switch to transmit the service data message from the backup virtual link to the main virtual link.

Optionally, the switching unit 54 is configured to, within a preset time, enable the slave node to simultaneously receive a downlink service data message transmitted on the main virtual link and the backup virtual link, and transmit an uplink service data message on the backup virtual link, and after the preset time, enable the slave node to transmit both the uplink service data message and the downlink service data message on the main virtual link.

Optionally, the detecting unit 53 is configured to, when the service type information received by the receiving unit 51 is L2VPN, start to perform failure detection on an end-to-end virtual link, wherein the end-to-end virtual link refers to a virtual link forming by splicing a virtual link between the slave node and the master node controlling the slave node and in the network virtualization system, with a virtual link between the master node controlling the slave node and a remote signaling gateway RSG and outside the network virtualization system.

Then, the switching unit 54 is configured to, when the detecting unit 53 detects that the main virtual link has failure and the backup virtual link has no failure, enable the slave node to switch to transmit the service data message on the backup virtual link, including: when detecting that the end-to-end virtual link where the main virtual link is located has failure and the end-to-end virtual link where the backup virtual link is located has no failure, switching, by the slave node, to transmit the service data message on the backup virtual link.

Optionally, the detecting unit 53 is configured to, when the service type information received by the receiving unit 51 is L3VPN, start to perform failure detection on the virtual link in the network virtualization system, wherein the virtual link in the network virtualization system refers to a virtual link from the slave node to the master node and in the network virtualization system.

Then, the switching unit 54 is configured to, when the detecting unit 53 detects that the virtual link in the network virtualization system where the main virtual link is located has failure and the virtual link in the network virtualization system where the backup virtual link is located has no failure, enable the slave node to transmit the service data message on the backup virtual link.

Optionally, the detecting unit 53 is configured to, when the service type information received by the receiving unit 51 is L2VPN, receive an enabling failure detection configuration command sent by the master node controlling the slave node through the control channel formed with the master node controlling the slave node, wherein the enabling failure detection configuration command is used for controlling the slave node to start to perform failure detection on an end-to-end virtual link, and the end-to-end virtual link refers to a virtual link forming by splicing a virtual link between the slave node and the master node controlling the slave node and in the network virtualization system, with a virtual link between the master node controlling the slave node and an RSG and outside the network virtualization system; start to perform the failure detection on the end-to-end virtual link according to the enabling failure detection configuration command received by the receiving unit 51.

Then, the switching unit 54 is configured to, when the detecting unit 53 detects that the end-to-end virtual link where the main virtual link is located has failure and the end-to-end virtual link where the backup virtual link is located has no failure, enable the slave node to transmit the service data message on the backup virtual link.

Figure 18:
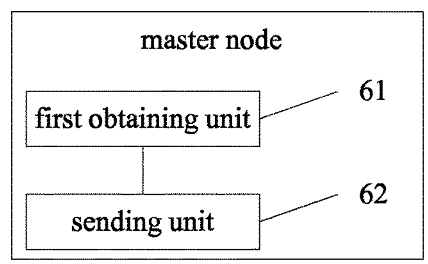
FIG. 18 is a block diagram of the composition of a master node provided by an embodiment of the present disclosure.

The embodiment of the present disclosure further provides a master node, which may be used for achieving the flows of the methods of all master node sides as shown in FIG. 2 to FIG. 14 and is specifically applied to a network virtualization system based on control and forwarding separation, the network virtualization system includes master nodes and a slave node, the slave node is controlled by a pair of mutually main-backup master nodes, the pair of mutually main-backup master nodes includes a main master node and a backup master node, a first virtual link is arranged between the slave node and the main master node controlling the slave node, a second virtual link is arranged between the slave node and the backup master node controlling the slave node, wherein, as shown in FIG. 18, the master node includes:

a first obtaining unit 61, configured to obtain service type information, wherein the service type information includes L2VPN and L3VPN;

a sending unit 62, configured to send the service type information obtained by the first obtaining unit 61 to the slave node controlled by the master node through a control channel between the master node and the slave node controlled by the master node, for enabling the slave node controlled by the master node to determine a main virtual link and a backup virtual link according to the received service type information, and perform failure detection on the determined main virtual link and the backup virtual link.

Figure 19:
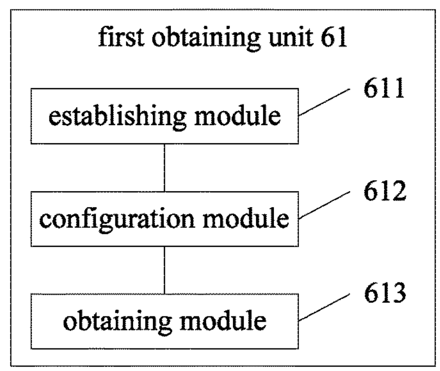
FIG. 19 is a block diagram of the composition of another master node provided by an embodiment of the present disclosure.

Optionally, as shown in FIG. 19, the first obtaining unit 61 includes:

an establishing module 611, configured to establish a corresponding virtual remote logical interface for an external interface of the slave node controlled by the master node, wherein the external interface refers to an interface of the slave node controlled by the master node, which is connected with a network device outside a network virtualization system based on control and forwarding separation;

a configuration module 612, configured to configure a service outside the network virtualization system based on control and forwarding separation on the virtual remote logical interface established by the establishing module 612; and an obtaining module 613, configured to obtain service type information corresponding to the configured service.

Optionally, the sending unit 62 is further configured to send an enabling failure detection configuration command to the slave node controlled by the master node, for enabling the slave node controlled by the master node to start to perform failure detection on an end-to-end virtual link according to the enabling failure detection configuration command; wherein the enabling failure detection configuration command is used for controlling the slave node controlled by the master node to start to perform the failure detection on the end-to-end virtual link, and the end-to-end virtual link refers to a virtual link forming by splicing a virtual link between the slave node controlled by the master node and the master node and in the network virtualization system, with a virtual link between the master node and an RSG and outside the network virtualization system.

Figure 20:
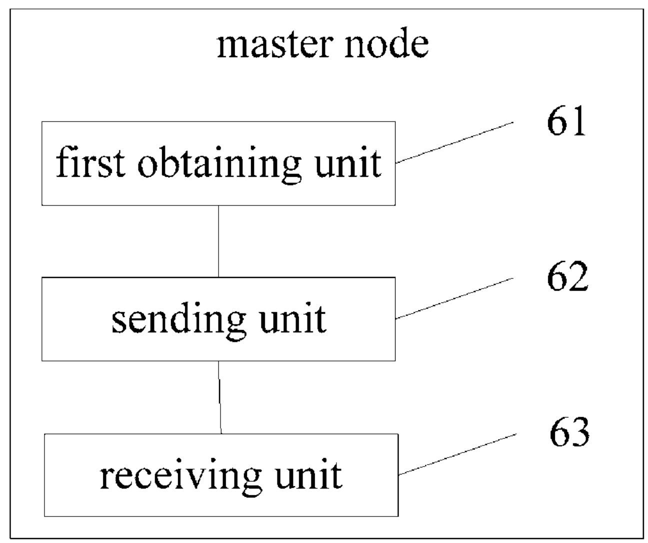
FIG. 20 is a block diagram of the composition of another master node provided by an embodiment of the present disclosure.

Optionally, as shown in FIG. 20, the master node further includes:

a receiving unit 63, configured to receive state information sent by an RSG, wherein the state information includes Active and Standby.

The sending unit 62 is configured to send the state information received by the receiving unit 63 to the slave node controlled by the master node through the control channel formed with the slave node controlled by the master node.

Figure 21:
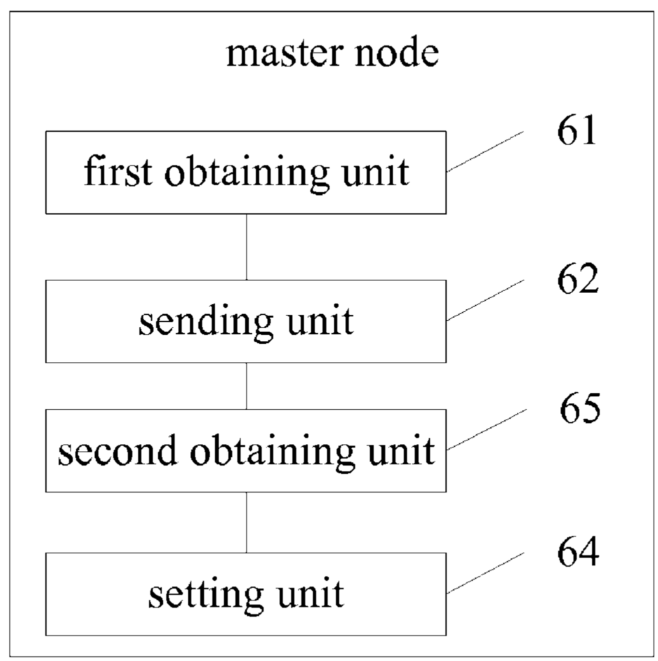
FIG. 21 is a block diagram of the composition of another master node provided by an embodiment of the present disclosure.

Optionally, as shown in FIG. 21, the master node further includes:

a setting unit 64 configured to, when the master node detects that the interface routing corresponding to the slave node controlled by the master node has failure, reduce the routing priority level of the virtual remote logical interface located on the master node of the slave node controlled by the master node;

a second obtaining unit 65, configured to obtain the routing priority level of the virtual remote logical interface on another master node corresponding to the slave node controlled by the master node, wherein the other master node and the master node are of a mutual main-backup relationship.

The sending unit 62 is configured to, when determining that the routing priority level of the virtual remote logical interface located on the master node of the slave node controlled by the master node is lower than the routing priority level of the virtual remote logical interface on the other master node corresponding to the slave node controlled by the master node, carry a Standby state in the interface routing state information, and send the Standby state to the slave node controlled by the master node through the control channel formed with the slave node controlled by the master node.

Figure 22:
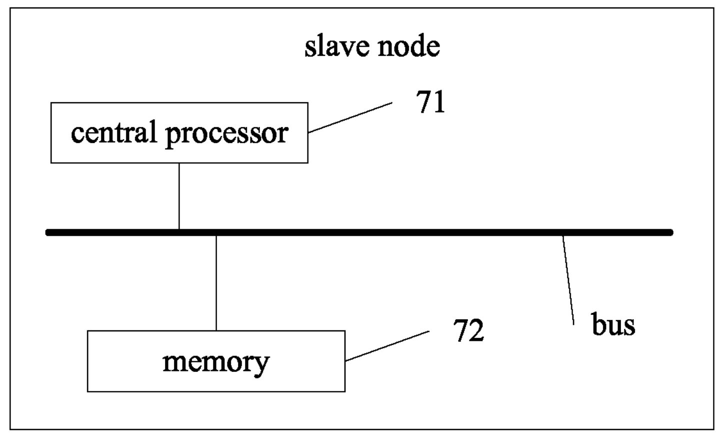
FIG. 22 is a block diagram of the composition of another slave node provided by an embodiment of the present disclosure.

The embodiment of the present disclosure further provides a slave node, as shown in FIG. 22, including at least one central processor 71 and a memory 72, wherein the memory 72 is configured with a code, and the central processor 71 may read the code in the memory 72 for achieving the flows of the methods of all slave node sides as shown in FIG. 2 to FIG. 14. The central processor 71 communicates with the memory 72 through a bus.

Wherein, the central processor 71 is configured to receive service type information sent by a master node controlling the slave node through a control channel between the master node controlling the slave node and the slave node, wherein the service type information includes L2VPN and L3VPN; determine a main virtual link and a backup virtual link according to the service type information, wherein the main virtual link is a virtual link in the first virtual link and the second virtual link, the main virtual link is a virtual link used for transmitting a service data message, and the backup virtual link is the other virtual link excluding the main virtual link in the first virtual link and the second virtual link; detect whether the main virtual link and the backup virtual link have failure or not; and when detecting that the main virtual link has failure and the backup virtual link has no failure, enable the slave node to switch to transmit the service data message on the backup virtual link.

The memory 72 is further configured to store the service type information.

The central processor 71 is further configured to, when the service type is L2VPN, set the first virtual link as the main virtual link and set the second virtual link as the backup virtual link.

The central processor 71 is further configured to, when the service type is L2VPN, determine the main virtual link and the backup virtual link according to the state information respectively sent by the main master node controlling the slave node and the backup master node controlling the slave node.

The central processor 71 is further configured to, when the service type is L3VPN, set the first virtual link as the main virtual link and set the second virtual link as the backup virtual link.

The central processor 71 is further configured to, when the service type is L3VPN, determine the main virtual link and the backup virtual link according to the interface routing state information respectively sent by the main master node controlling the slave node and the backup master node controlling the slave node, wherein the interface routing state information refers to the routing state information of a virtual remote logical interface having a corresponding relationship with an external interface of the slave node and located on the main master node or the backup master node, and the external interface refers to an interface of the slave node, which is connected with a network device outside a network virtualization system based on control and forwarding separation.

The memory 72 is further configured to store the state information and the interface routing state information.

The central processor 71 is further configured to enable the slave node to receive the state information sent by the main master node through the control channel between the main master node and the slave node; enable the slave node to receive the state information sent by the backup master node through the control channel between the backup master node and the slave node; when the received state information sent by the main master node is an Active active state, enable the slave node to set the first virtual link as the main virtual link, and transmit the service data message on the first virtual link, and when the received state information sent by the backup master node is a Standby standby state, set the second virtual link as the backup virtual link; when the received state information sent by the main master node is Standby, set the first virtual link as the backup virtual link, and when the received state information sent by the backup master node is Active, set the second virtual link as the main virtual link, and transmit the service data message on the second virtual link.

The central processor 71 is further configured to enable the slave node to receive the interface routing state information sent by the main master node through the control channel between the main master node and the slave node; enable the slave node to receive the interface routing state information sent by the backup master node through the control channel between the backup master node and the slave node; when the received interface routing state information sent by the main master node is the Active active state, enable the slave node to set the first virtual link as the main virtual link, and transmit the service data message on the first virtual link, and when the received interface routing state information sent by the backup master node is the Standby standby state, enable the slave node to set the second virtual link as the backup virtual link; when the received interface routing state information sent by the main master node is the Standby standby state, set the first virtual link as the backup virtual link, and when the received interface routing state information sent by the backup master node is the Active active state, set the second virtual link as the main virtual link, and transmit the service data message on the second virtual link.

The central processor 71 is further configured to, when detecting that the failure of the main virtual link is recovered, enable the slave node to switch to transmit the service data message from the backup virtual link to the main virtual link.

The central processor 71 is further configured to, within a preset time, enable the slave node to simultaneously receive a downlink service data message transmitted on the main virtual link and the backup virtual link, and transmit an uplink service data message on the backup virtual link, and after the preset time, enable the slave node to transmit both the uplink service data message and the downlink service data message on the main virtual link.

The central processor 71 is further configured to, when the service type information is L2VPN, enable the slave node to start to perform failure detection on an end-to-end virtual link, wherein the end-to-end virtual link refers to a virtual link forming by splicing a virtual link between the slave node and the master node controlling the slave node and in the network virtualization system, with a virtual link between the master node controlling the slave node and a remote signaling gateway RSG and outside the network virtualization system; when detecting that the main virtual link has failure and the backup virtual link has no failure, enable the slave node to switch to transmit the service data message on the backup virtual link.

The central processor 71 is further configured to, when the service type information is L3VPN, enable the slave node to start to perform failure detection on the virtual link in the network virtualization system, wherein the virtual link in the network virtualization system refers to a virtual link from the slave node to the master node and in the network virtualization system; when detecting that the virtual link in the network virtualization system where the main virtual link is located has failure and the virtual link in the network virtualization system where the backup virtual link is located has no failure, enable the slave node to transmit the service data message on the backup virtual link.

The central processor 71 is further configured to, when the service type information is L2VPN, enable the slave node to receive an enabling failure detection configuration command sent by the master node controlling the slave node through the control channel formed with the master node controlling the slave node, wherein the enabling failure detection configuration command is used for controlling the slave node to start to perform failure detection on an end-to-end virtual link, and the end-to-end virtual link refers to a virtual link forming by splicing a virtual link between the slave node and the master node controlling the slave node and in the network virtualization system, with a virtual link between the master node controlling the slave node and an RSG and outside the network virtualization system; start to perform the failure detection on the end-to-end virtual link according to the enabling failure detection configuration command; when detecting that the end-to-end virtual link where the main virtual link is located has failure and the end-to-end virtual link where the backup virtual link is located has no failure, enable the slave node to transmit the service data message on the backup virtual link.

Figure 23:
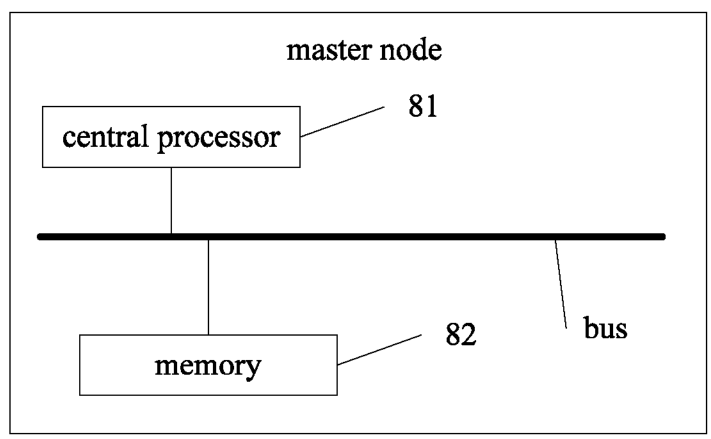
FIG. 23 is a block diagram of the composition of another master node provided by an embodiment of the present disclosure.

The embodiment of the present disclosure further provides a master node, as shown in FIG. 23, including at least one central processor 81 and a memory 82, wherein the memory 82 is configured with a code, and the central processor 81 may read the code in the memory 82 for achieving the flows of the methods of all slave node sides as shown in FIG. 2 to FIG. 14. The central processor 81 communicates with the memory 82 through a bus.

Wherein, the central processor 81 is configured to obtain service type information, wherein the service type information includes L2VPN and L3VPN; send the service type information to the slave node controlled by the master node through a control channel between the master node and the slave node controlled by the master node, for enabling the slave node controlled by the master node to determine a main virtual link and a backup virtual link according to the received service type information, and perform failure detection on the determined main virtual link and the backup virtual link.

The memory 82 is further configured to store the service type information.

Optionally, the central processor 81 is configured to establish a corresponding virtual remote logical interface for an external interface of the slave node controlled by the master node, wherein the external interface refers to an interface of the slave node controlled by the master node, which is connected with a network device outside a network virtualization system based on control and forwarding separation; configure a service outside the network virtualization system based on control and forwarding separation on the virtual remote logical interface, and obtain the service type information corresponding to the configured service.

Optionally, the central processor 81 is configured to, after sending the service type information to the slave node, send an enabling failure detection configuration command to the slave node controlled by the master node, for enabling the slave node controlled by the master node to start to perform failure detection on an end-to-end virtual link according to the enabling failure detection configuration command; wherein the enabling failure detection configuration command is used for controlling the slave node controlled by the master node to start to perform the failure detection on the end-to-end virtual link, and the end-to-end virtual link refers to a virtual link forming by splicing a virtual link between the slave node controlled by the master node and the master node and in the network virtualization system, with a virtual link between the master node and an RSG and outside the network virtualization system.

Optionally, the central processor 81 is configured to, after sending the service type information to the slave node, receive state information sent by an RSG, wherein the state information includes Active and Standby; send the state information to the slave node controlled by the master node through the control channel formed with the slave node controlled by the master node.

Optionally, the central processor 81 is configured to, when the master node detects that the interface routing corresponding to the slave node controlled by the master node has failure, reduce the routing priority level of the virtual remote logical interface located on the master node of the slave node controlled by the master node, and obtain the routing priority level of the virtual remote logical interface on another master node corresponding to the slave node controlled by the master node, wherein the other master node and the master node are of a mutual main-backup relationship; when determining that the routing priority level of the virtual remote logical interface located on the master node of the slave node controlled by the master node is lower than the routing priority level of the virtual remote logical interface on the other master node corresponding to the slave node controlled by the master node, carry a Standby state in the interface routing state information, and send the Standby state to the slave node controlled by the master node through the control channel formed with the slave node controlled by the master node.

The embodiment of the present disclosure further provides a network virtualization system, including master nodes and a slave node, the slave node is controlled by a pair of mutually main-backup master nodes, the pair of mutually main-backup master nodes includes a main master node and a backup master node, a first virtual link is arranged between the slave node and the main master node controlling the slave node, a second virtual link is arranged between the slave node and the backup master node controlling the slave node. The flows of all the methods as shown in FIG. 2 to FIG. 13 may be achieved.

The embodiments of the present disclosure provide a master node, a slave node and a network virtualization system. In the network virtualization system based on control and forwarding separation, the master node having a control function obtains the current service type information and notifies the slave node of the current service type information, for enabling the slave node to determine the main virtual link and the backup virtual link according to the service type information and perform the failure detection, and when detecting that the main virtual link has failure and the backup virtual link has no failure, the service data message is switched to be transmitted on the backup virtual link, to ensure non-interrupted transmission of the service data message in the brand-new system architecture provided by the present disclosure, so as to ensure the service reliability.

By means of the above-mentioned descriptions of the embodiments, those skilled in the art to which the present disclosure pertains may clearly understand that the present disclosure may be implemented by software plus necessary universal hardware, and may also be implemented by hardware, but under most conditions, the former is a better embodiment. Based on this understanding, the technical solutions in the present disclosure essentially or the part contributing to the prior art may be embodied in the form of a software product, the computer software product may be stored in a storage medium, such as a floppy disk of a computer, a hard disk, an optical disk or the like, and include several instructions for instructing a computer device (may be a personal computer, a server, or a network device and the like) to perform the methods in the embodiments of the present disclosure.

The foregoing descriptions are merely specific embodiments of the present disclosure, rather than limiting the protection scope of the present disclosure. Those skilled in the art could readily think of variations or substitutions within the disclosed technical scope of the present disclosure, and these variations or substitutions shall fall within the protection scope of the present disclosure. Accordingly, the protection scope of the claims should prevail over the protection scope of the present disclosure.

What is claimed is:

1. A method for protecting service reliability, wherein the method is applied to a network virtualization system based on control and forwarding separation, the network virtualization system comprises master nodes and a slave node, the slave node is controlled by a pair of mutually main-backup master nodes, the pair of mutually main-backup master nodes comprise a main master node and a backup master node, a first virtual link is arranged between the slave node and the main master node controlling the slave node, a second virtual link is arranged between the slave node and the backup master node controlling the slave node, and the method comprises:

receiving, by the slave node, service type information sent by a master node controlling the slave node through a control channel between the master node controlling the slave node and the slave node, wherein the service type information comprises L2VPN and L3VPN, wherein the master node is the main master node or the backup master node;

determining, by the slave node, a main virtual link and a backup virtual link according to the service type information, wherein the main virtual link is a virtual link of the first virtual link and the second virtual link, the main virtual link is a virtual link used for transmitting a service data message, and the backup virtual link is the other virtual link rather than the main virtual link of the first virtual link and the second virtual link;

detecting, by the slave node, whether the main virtual link and the backup virtual link have failure; and in response to detecting that the main virtual link has failure and the backup virtual link has no failure, switching, by the slave node, to transmit the service data message on the backup virtual link.

2. The method of claim 1, wherein the determining the main virtual link and the backup virtual link according to the service type information, comprises:

when the service type is L2VPN, setting, by the slave node, the first virtual link as the main virtual link, and setting the second virtual link as the backup virtual link; or, when the service type is L2VPN, determining, by the slave node, the main virtual link and the backup virtual link according to state information respectively sent by the main master node controlling the slave node and the backup master node controlling the slave node; or, when the service type is L3VPN, setting, by the slave node, the first virtual link as the main virtual link, and setting the second virtual link as the backup virtual link; or, when the service type is L3VPN, determining, by the slave node, the main virtual link and the backup virtual link according to interface routing state information respectively sent by the main master node controlling the slave node and the backup master node controlling the slave node, wherein the interface routing state information refers to routing state information of a virtual remote logical interface having a corresponding relationship with an external interface of the slave node and located on the main master node or the backup master node, and the external interface refers to an interface of the slave node, which is connected with a network device outside the network virtualization system based on control and forwarding separation.

3. The method of claim 2, wherein the determining, by the slave node, the main virtual link and the backup virtual link according to the state information sent by the main master node controlling the slave node and the backup master node controlling the slave node, comprises:

receiving, by the slave node, the state information sent by the main master node through the control channel between the main master node and the slave node; and receiving, by the slave node, the state information sent by the backup master node through the control channel between the backup master node and the slave node;

when the received state information sent by the main master node is an Active state, setting, by the slave node, the first virtual link as the main virtual link, and transmitting the service data message on the first virtual link, and when the received state information sent by the backup master node is a Standby state, setting the second virtual link as the backup virtual link; or, when the received state information sent by the main master node is Standby, setting, by the slave node, the first virtual link as the backup virtual link, and when the received state information sent by the backup master node is Active, setting, by the slave node, the second virtual link as the main virtual link, and transmitting the service data message on the second virtual link.

4. The method of claim 2, wherein the determining, by the slave node, the main virtual link and the backup virtual link according to interface routing state information respectively sent by the main master node controlling the slave node and the backup master node controlling the slave node, comprises:

receiving, by the slave node, the interface routing state information sent by the main master node through the control channel between the main master node and the slave node;

receiving, by the slave node, the interface routing state information sent by the backup master node through the control channel between the backup master node and the slave node;

when the received interface routing state information sent by the main master node is an Active state, setting, by the slave node, the first virtual link as the main virtual link, and transmitting the service data message on the first virtual link; when the received interface routing state information sent by the backup master node is a Standby state, setting, by the slave node, the second virtual link as the backup virtual link; or, when the received interface routing state information sent by the main master node is the Standby state, setting, by the slave node, the first virtual link as the backup virtual link, and when the received interface routing state information sent by the backup master node is the Active state, setting, by the slave node, the second virtual link as the main virtual link, and transmitting the service data message on the second virtual link.

5. The method of claim 1, further comprising:

within a preset time, simultaneously receiving, by the slave node, downlink service data messages transmitted on the main virtual link and the backup virtual link, and transmitting an uplink service data message on the backup virtual link, after the preset time, switching, by the slave node, to transmit both the uplink service data message and the downlink service data message on the main virtual link.

6. The method of claim 1, wherein the detecting, by the slave node, whether the main virtual link and the backup virtual link have failure, comprises:

when the service type information is L2VPN, starting, by the slave node, to perform failure detection on an end-to-end virtual link, wherein the end-to-end virtual link refers to a virtual link forming by splicing a virtual link between the slave node and the master node controlling the slave node and in the network virtualization system, with a virtual link between the master node controlling the slave node and a remote signaling gateway RSG and outside the network virtualization system; correspondingly, the when detecting that the main virtual link has failure and the backup virtual link has no failure, switching, by the slave node, to transmit the service data message on the backup virtual link, comprises: when detecting that the end-to-end virtual link where the main virtual link is located has failure and the end-to-end virtual link where the backup virtual link is located has no failure, switching, by the slave node, to transmit the service data message on the backup virtual link; or when the service type information is L3VPN, starting, by the slave node, to perform failure detection on the virtual link in the network virtualization system, wherein the virtual link in the network virtualization system refers to a virtual link from the slave node to the master node and in the network virtualization system; correspondingly, the when detecting that the main virtual link has failure and the backup virtual link has no failure, switching, by the slave node, to transmit the service data message on the backup virtual link, comprises: when detecting that the virtual link in the network virtualization system where the main virtual link is located has failure and the virtual link in the network virtualization system where the backup virtual link is located has no failure, switching, by the slave node, to transmit the service data message on the backup virtual link.

7. The method of claim 1, wherein the detecting, by the slave node, whether the main virtual link and the backup virtual link have failure, comprises:

when the service type information is L2VPN, receiving, by the slave node, an enabling failure detection configuration command sent by the master node controlling the slave node through the control channel formed with the master node controlling the slave node, wherein the enabling failure detection configuration command is used for controlling the slave node to start to perform failure detection on an end-to-end virtual link, and the end-to-end virtual link refers to a virtual link forming by splicing a virtual link between the slave node and the master node controlling the slave node and in the network virtualization system, with a virtual link between the master node controlling the slave node and an RSG and outside the network virtualization system;

starting, by the slave node, to perform failure detection on the end-to-end virtual link according to the enabling failure detection configuration command; correspondingly, the when detecting that the main virtual link has failure and the backup virtual link has no failure, switching, by the slave node, to transmit the service data message on the backup virtual link, comprises: when detecting that the end-to-end virtual link where the main virtual link is located has failure and the end-to-end virtual link where the backup virtual link is located has no failure, switching, by the slave node, to transmit the service data message on the backup virtual link.

8. A method for protecting service reliability, wherein the method is applied to a network virtualization system based on control and forwarding separation, the network virtualization system comprises master nodes and a slave node, the slave node is controlled by a pair of mutually main-backup master nodes, the pair of mutually main-backup master nodes comprise a main master node and a backup master node, a first virtual link is arranged between the slave node and the main master node controlling the slave node, a second virtual link is arranged between the slave node and the backup master node controlling the slave node, and the method comprises:

obtaining, by a master node, service type information, wherein the service type information comprises L2VPN and L3VPN, wherein the master node is the main master node or the backup master node; and sending the service type information to the slave node controlled by the master node through a control channel between the master node and the slave node controlled by the master node, for enabling the slave node controlled by the master node to determine a main virtual link and a backup virtual link according to the received service type information, and perform failure detection on the determined main virtual link and the backup virtual link.

9. The method of claim 8, wherein the obtaining, by the master node, service type information, comprises:

establishing a corresponding virtual remote logical interface for an external interface of the slave node controlled by the master node, wherein the external interface refers to an interface of the slave node controlled by the master node, which is connected with a network device outside the network virtualization system based on control and forwarding separation; and configuring a service outside the network virtualization system based on control and forwarding separation on the virtual remote logical interface, and obtaining the service type information corresponding to the configured service.

10. The method of claim 9, wherein after the sending the service type information to the slave node, the method further comprises:

sending an enabling failure detection configuration command to the slave node controlled by the master node, for enabling the slave node controlled by the master node to start to perform failure detection on an end-to-end virtual link according to the enabling failure detection configuration command; wherein the enabling failure detection configuration command is used for controlling the slave node controlled by the master node to start to perform the failure detection on the end-to-end virtual link, and the end-to-end virtual link refers to a virtual link forming by splicing a virtual link between the slave node controlled by the master node and the master node and in the network virtualization system, with a virtual link between the master node and a remote signaling gateway (RSG) and outside the network virtualization system.

11. The method of claim 8, wherein after the sending the service type information to the slave node controlled by the master node, the method further comprises:

receiving, by the master node, state information sent by a remote signaling gateway (RSG), wherein the state information comprises Active and Standby; and sending, by the master node, the state information to the slave node controlled by the master node through the control channel formed with the slave node controlled by the master node.

12. The method of claim 8, wherein after the sending the service type information to the slave node, the method further comprises:

when the master node detects that the interface routing corresponding to the slave node controlled by the master node has failure, reducing a routing priority level of the virtual remote logical interface located on the master node of the slave node controlled by the master node, and obtaining a routing priority level of the virtual remote logical interface on another master node corresponding to the slave node controlled by the master node, wherein the other master node and the master node are of a mutual main-backup relationship;

when determining that the routing priority level of the virtual remote logical interface located on the master node of the slave node controlled by the master node is lower than the routing priority level of the virtual remote logical interface on another master node corresponding to the slave node controlled by the master node, carrying a Standby state in interface routing state information, and sending the Standby state to the slave node controlled by the master node through the control channel formed with the slave node controlled by the master node.

13. A slave node, wherein the slave node is applied to a network virtualization system based on control and forwarding separation, the network virtualization system comprises master nodes and a slave node, the slave node is controlled by a pair of mutually main-backup master nodes, the pair of mutually main-backup master nodes comprises a main master node and a backup master node, a first virtual link is arranged between the slave node and the main master node controlling the slave node, a second virtual link is arranged between the slave node and the backup master node controlling the slave node, and the slave node comprises:

a processor; and a non-transitory computer-readable storage medium including computer-executable instructions executed by the processor to perform:

receiving service type information sent by a master node controlling the slave node through a control channel between the master node controlling the slave node and the slave node, wherein the service type information comprises L2VPN and L3VPN, wherein the master node is the main master node or the backup master node;

determining a main virtual link and a backup virtual link according to the service type information received by the receiving unit; wherein the main virtual link is a virtual link of the first virtual link and the second virtual link, the main virtual link is a virtual link used for transmitting a service data message, and the backup virtual link is the other virtual link rather than the main virtual link of the first virtual link and the second virtual link;

detecting whether the main virtual link and the backup virtual link determined by the determining unit have failure; and when the detecting unit detects that the main virtual link has failure and the backup virtual link has no failure, switching to transmit the service data message on the backup virtual link.

14. The storage medium of claim 13, further comprising computer-executable instructions for:

when the service type is L2VPN, setting the first virtual link as the main virtual link and setting the second virtual link as the backup virtual link; and determining the main virtual link and the backup virtual link according to state information respectively sent by the main master node controlling the slave node and the backup master node controlling the slave node;

when the service type is L3VPN, setting the first virtual link as the main virtual link and setting the second virtual link as the backup virtual link; and determining the main virtual link and the backup virtual link according to interface routing state information respectively sent by the main master node controlling the slave node and the backup master node controlling the slave node, wherein the interface routing state information refers to the routing state information of a virtual remote logical interface having a corresponding relationship with an external interface of the slave node and located on the main master node or the backup master node, and the external interface refers to an interface of the slave node, which is connected with a network device outside the network virtualization system based on control and forwarding separation.

15. The storage medium of claim 14, further comprising computer-executable instructions for:

receiving the state information sent by the main master node through the control channel between the main master node and the slave node; and receiving the state information sent by the backup master node through the control channel between the backup master node and the slave node; and when the state information sent by the main master node and received by the first receiving module is an Active state, setting the first virtual link as the main virtual link, and transmitting the service data message on the first virtual link, when the state information sent by the backup master node and received by the first receiving module is a Standby state, setting the second virtual link as the backup virtual link; and when the state information sent by the main master node and received by the first receiving module is Standby, setting the first virtual link as the backup virtual link, when the state information sent by the backup master node and received by the first receiving module is Active, setting the second virtual link as the main virtual link, and transmitting the service data message on the second virtual link.

16. The storage medium of claim 14, further comprising computer-executable instructions for:

receiving the interface routing state information sent by the main master node through the control channel between the main master node and the slave node; and receiving the interface routing state information sent by the backup master node through the control channel between the backup master node and the slave node; and when the interface routing state information sent by the main master node and received by the second receiving module is the Active state, setting the first virtual link as the main virtual link, and transmitting the service data message on the first virtual link, when the interface routing state information sent by the backup master node and received by the second receiving module is the Standby state, setting the second virtual link as the backup virtual link; and when the interface routing state information sent by the main master node is the Standby state, setting the first virtual link as the backup virtual link, when the interface routing state information sent by the backup master node and received by the second receiving module is the Active state, setting the second virtual link as the main virtual link, and transmitting the service data message on the second virtual link.

17. The storage medium of claim 13, further comprising computer-executable instructions for:

within a preset time, simultaneously receiving downlink service data messages transmitted on the main virtual link and the backup virtual link, and transmitting an uplink service data message on the backup virtual link, after the preset time, transmitting both the uplink service data message and the downlink service data message on the main virtual link.

18. The storage medium of claim 13, further comprising computer-executable instructions for:

when the service type information received by the receiving unit is L2VPN, starting to perform failure detection on an end-to-end virtual link, wherein the end-to-end virtual link refers to a virtual link forming by splicing a virtual link between the slave node and the master node controlling the slave node and in the network virtualization system, with a virtual link between the master node controlling the slave node and a remote signaling gateway (RSG) and outside the network virtualization system;

when the detecting unit detects that the main virtual link has failure and the backup virtual link has no failure, switching to transmit the service data message on the backup virtual link, comprises: when detecting that the end-to-end virtual link where the main virtual link is located has failure and the end-to-end virtual link where the backup virtual link is located has no failure, switching to transmit the service data message on the backup virtual link;

or, when the service type information received by the receiving unit is L3VPN, starting to perform failure detection on the virtual link in the network virtualization system, wherein the virtual link in the network virtualization system refers to a virtual link from the slave node to the master node and in the network virtualization system;

when the detecting unit detects that the virtual link in the network virtualization system where the main virtual link is located has failure and the virtual link in the network virtualization system where the backup virtual link is located has no failure, transmitting the service data message on the backup virtual link.

19. The storage medium of claim 13, further comprising computer-executable instructions for:

when the service type information received by the receiving unit is L2VPN, receiving an enabling failure detection configuration command sent by the master node controlling the slave node through the control channel formed with the master node controlling the slave node, wherein the enabling failure detection configuration command is used for controlling the slave node to start to perform failure detection on an end-to-end virtual link, and the end-to-end virtual link refers to a virtual link forming by splicing a virtual link between the slave node and the master node controlling the slave node and in the network virtualization system, with a virtual link between the master node controlling the slave node and a remote signaling gateway (RSG) and outside the network virtualization system; and starting to perform the failure detection on the end-to-end virtual link according to the enabling failure detection configuration command received;

when the detecting unit detects that the end-to-end virtual link where the main virtual link is located has failure and the end-to-end virtual link where the backup virtual link is located has no failure, transmitting the service data message on the backup virtual link.

20. A master node, wherein the master node is applied to a network virtualization system based on control and forwarding separation, the network virtualization system comprises master nodes and a slave node, the slave node is controlled by a pair of mutually main-backup master nodes, the pair of mutually main-backup master nodes comprises a main master node and a backup master node, a first virtual link is arranged between the slave node and the main master node controlling the slave node, a second virtual link is arranged between the slave node and the backup master node controlling the slave node, and the master node comprises:

a processor; and a non-transitory computer-readable storage medium including computer-executable instructions executed by the processor to perform:

obtaining service type information, wherein the service type information comprises L2VPN and L3VPN, wherein the master node is the main master node or the backup master node; and sending the service type information obtained by the first obtaining unit to the slave node controlled by the master node through a control channel between the master node and the slave node controlled by the master node, for enabling the slave node controlled by the master node to determine a main virtual link and a backup virtual link according to the received service type information, and perform failure detection on the determined main virtual link and the backup virtual link.

21. The storage medium of claim 20, further comprising computer-executable instructions for:

establishing a corresponding virtual remote logical interface for an external interface of the slave node controlled by the master node, wherein the external interface refers to an interface of the slave node controlled by the master node, which is connected with a network device outside the network virtualization system based on control and forwarding separation;

configuring a service outside the network virtualization system based on control and forwarding separation on the virtual remote logical interface established by the establishing module; and obtaining service type information corresponding to the configured service.

22. The storage medium of claim 21, further comprising computer-executable instructions for:

sending an enabling failure detection configuration command to the slave node controlled by the master node, for enabling the slave node controlled by the master node to start to perform failure detection on an end-to-end virtual link according to the enabling failure detection configuration command; wherein the enabling failure detection configuration command is used for controlling the slave node controlled by the master node to start to perform the failure detection on the end-to-end virtual link, and the end-to-end virtual link refers to a virtual link forming by splicing a virtual link between the slave node and the master node and in the network virtualization system, with a virtual link between the master node and a remote signaling gateway (RSG) and outside the network virtualization system.

23. The storage medium of claim 20, further comprising computer-executable instructions for:

receiving state information sent by a remote signaling gateway (RSG), wherein the state information comprises Active and Standby; and sending the state information received by the receiving unit to the slave node controlled by the master node through the control channel formed with the slave node controlled.

24. The storage medium of claim 20, further comprising:

when the master node detects that the interface routing corresponding to the slave node controlled by the master node has failure, reducing a routing priority level of the virtual remote logical interface located on the master node of the slave node controlled by the master node;

obtaining a routing priority level of the virtual remote logical interface on the other master node corresponding to the slave node controlled by the master node, wherein the other master node and the master node are of a main-backup relationship mutually; and when determining that the routing priority level of the virtual remote logical interface located on the master node of the slave node controlled by the master node is lower than the routing priority level of the virtual remote logical interface on the other master node corresponding to the slave node controlled by the master node, carrying a Standby state in interface routing state information, and sending the Standby state to the slave node controlled by the master node through the control channel formed with the slave node controlled by the master node.

* * * * *